Figure 1:
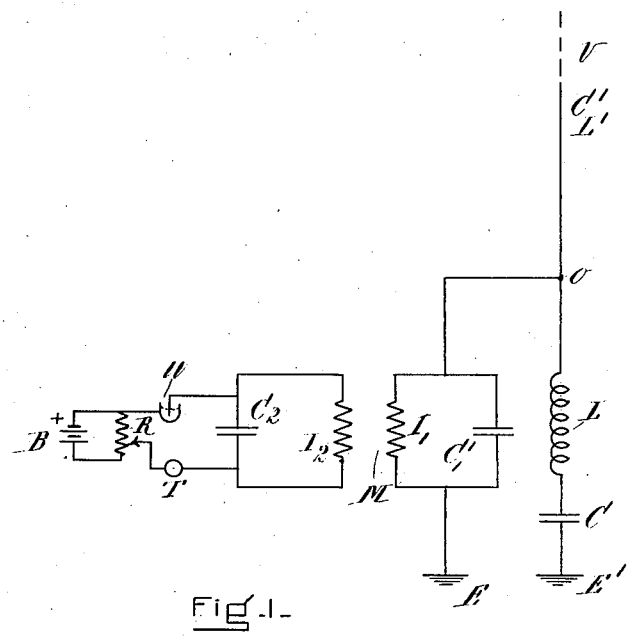

No. 884,107. PATENTED APR. 7, 1908.
J. S. STONE.
SPACE TELEGRAPHY.
APPLICATION FILED AUG. 3, 1906.

15 SHEETS—SHEET 1.

WITNESSES:
G. A. Higgins
E. B. Tomlinson.

INVENTOR:
John Stone Stone
by Geo. K. Woodworth
Atty.

No. 884,107. PATENTED APR. 7, 1908.
J. S. STONE.
SPACE TELEGRAPHY.
APPLICATION FILED AUG. 3, 1906.

15 SHEETS—SHEET 2.

WITNESSES:
G. A. Higgins
E. B. Tomlinson

INVENTOR:
John Stone Stone
by Geo. K. Woodworth
Atty.

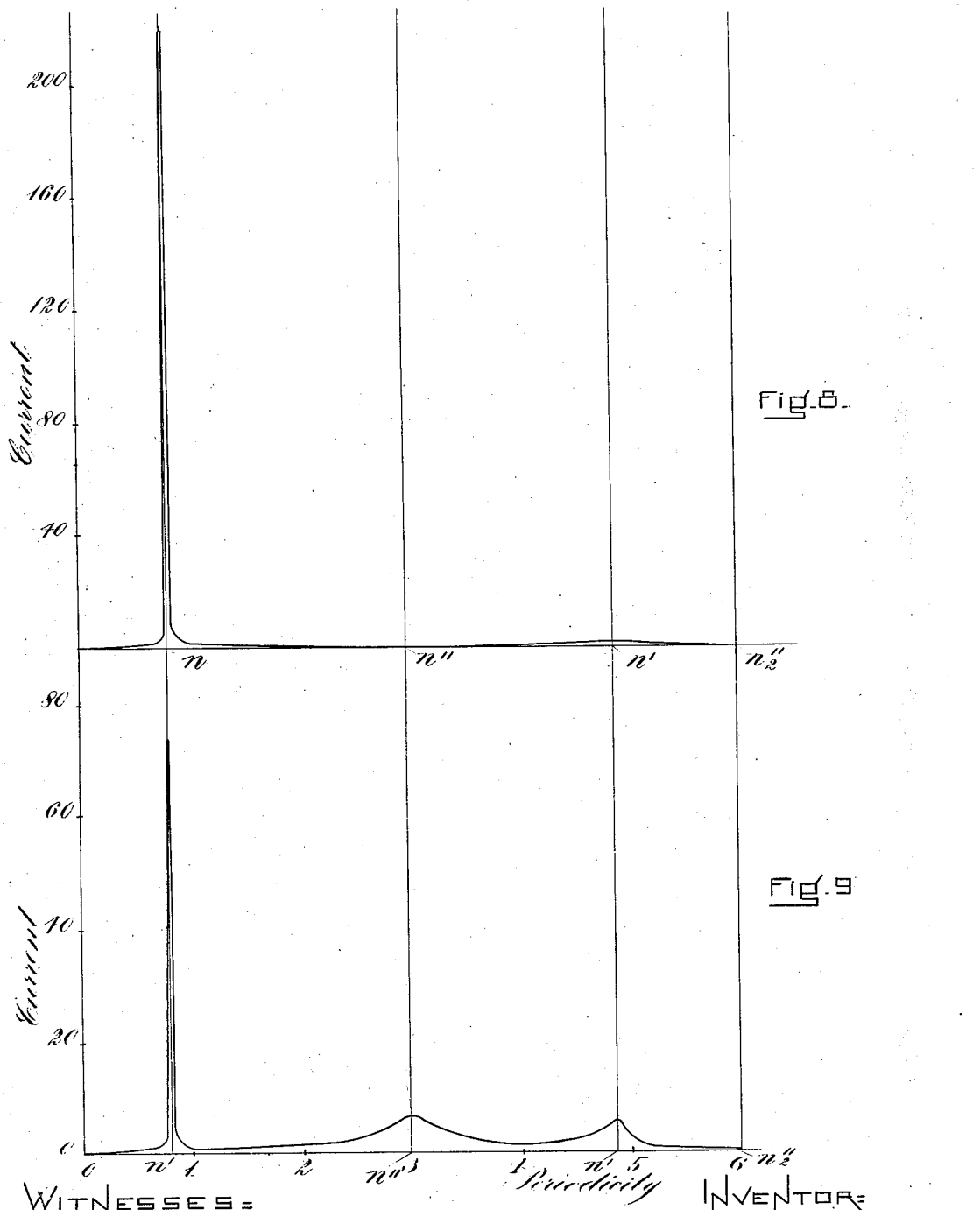

No. 884,107. PATENTED APR. 7, 1908.
J. S. STONE.
SPACE TELEGRAPHY.
APPLICATION FILED AUG. 3, 1906.
15 SHEETS—SHEET 7.
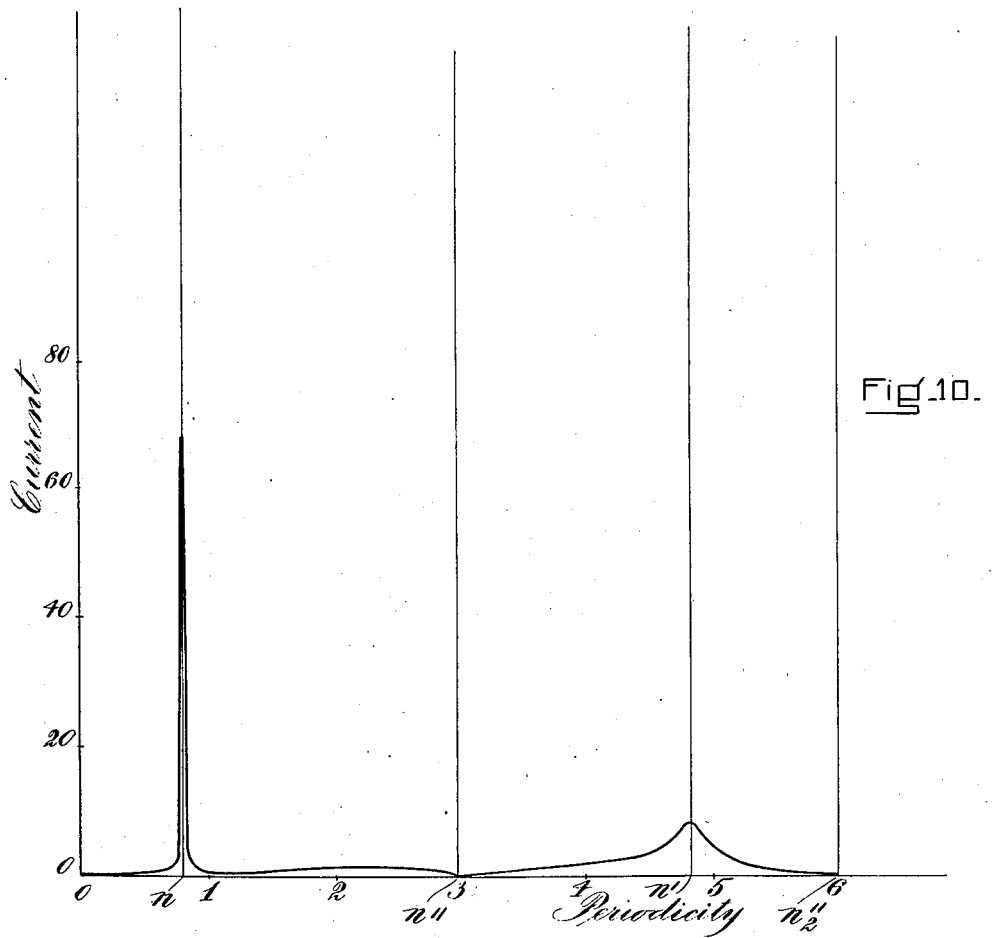

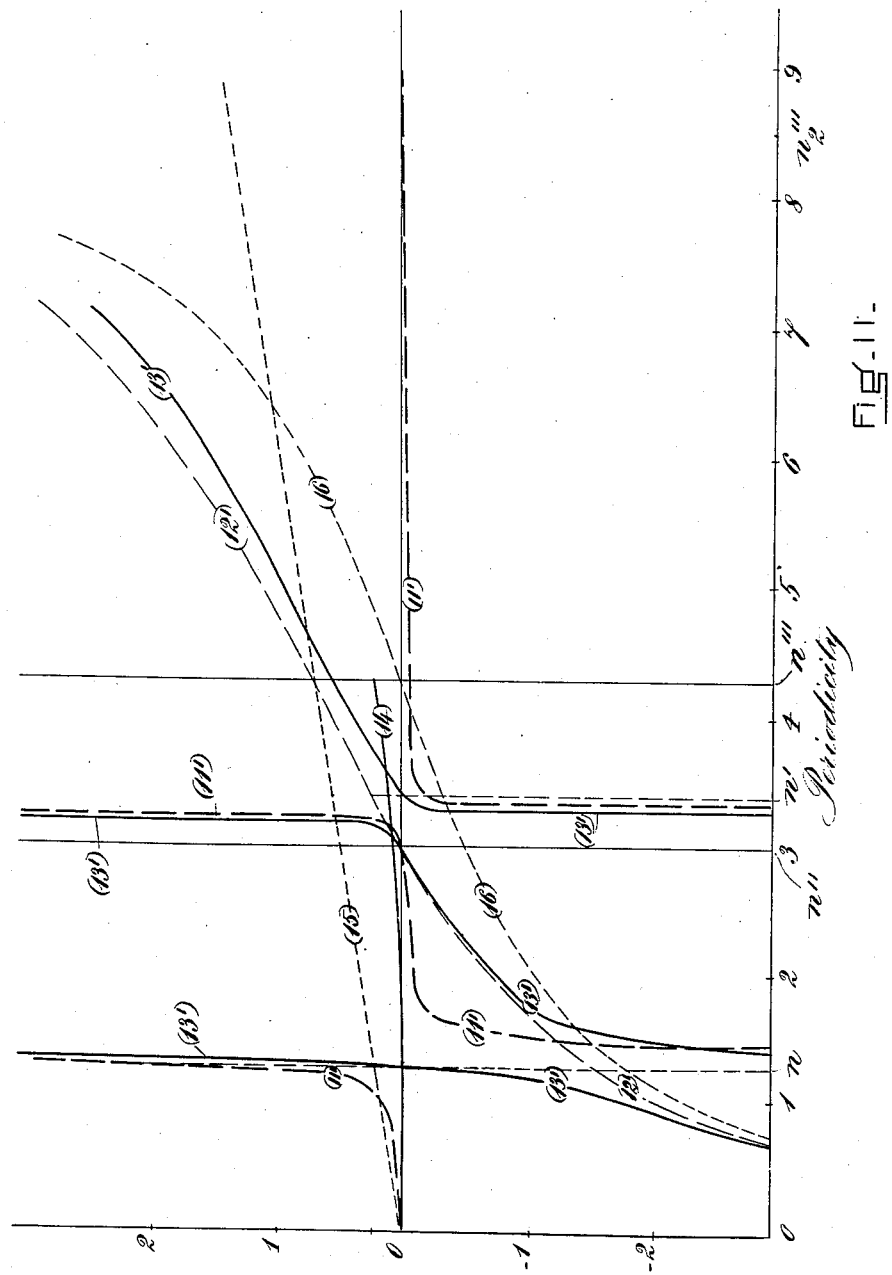

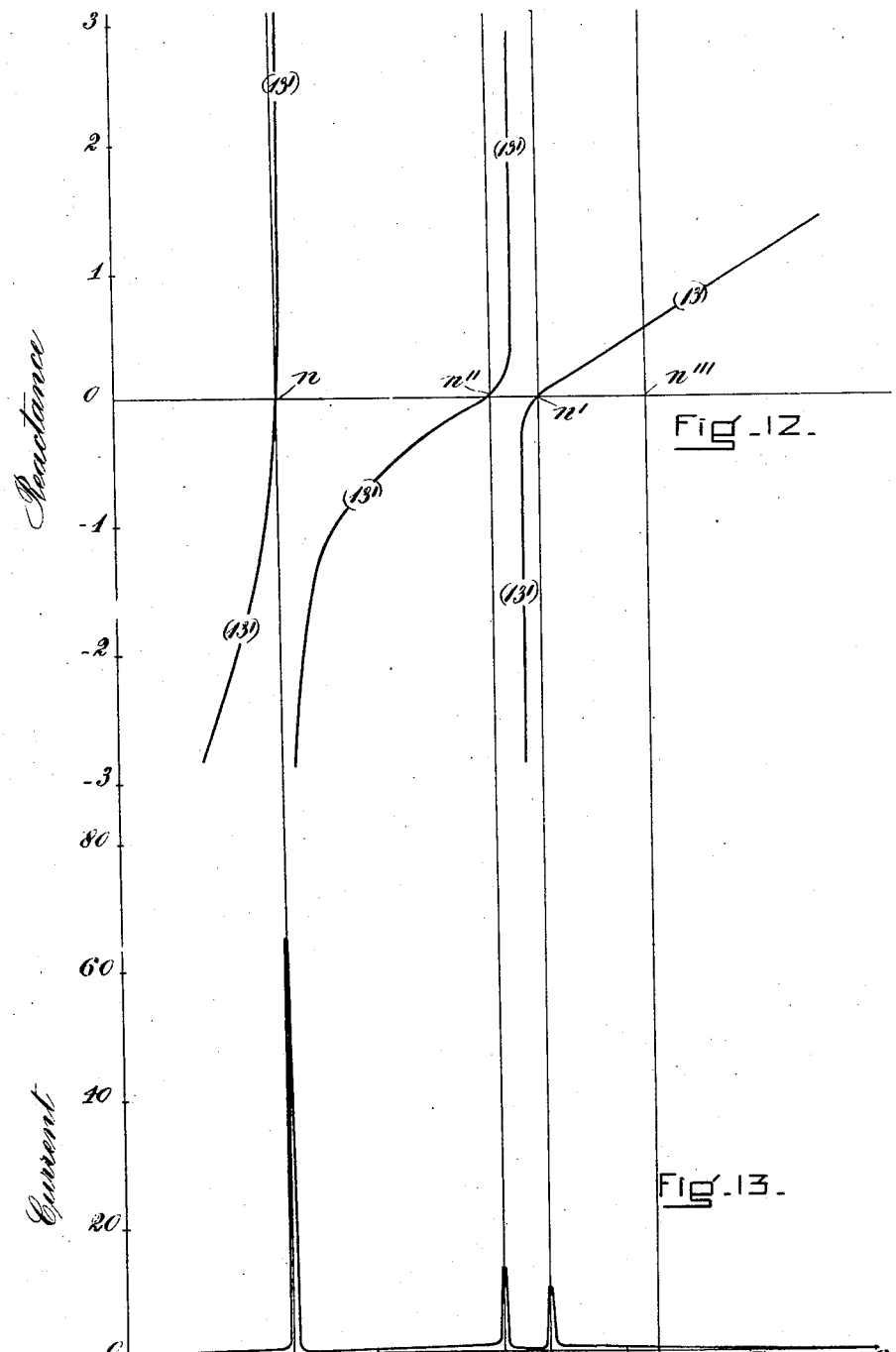

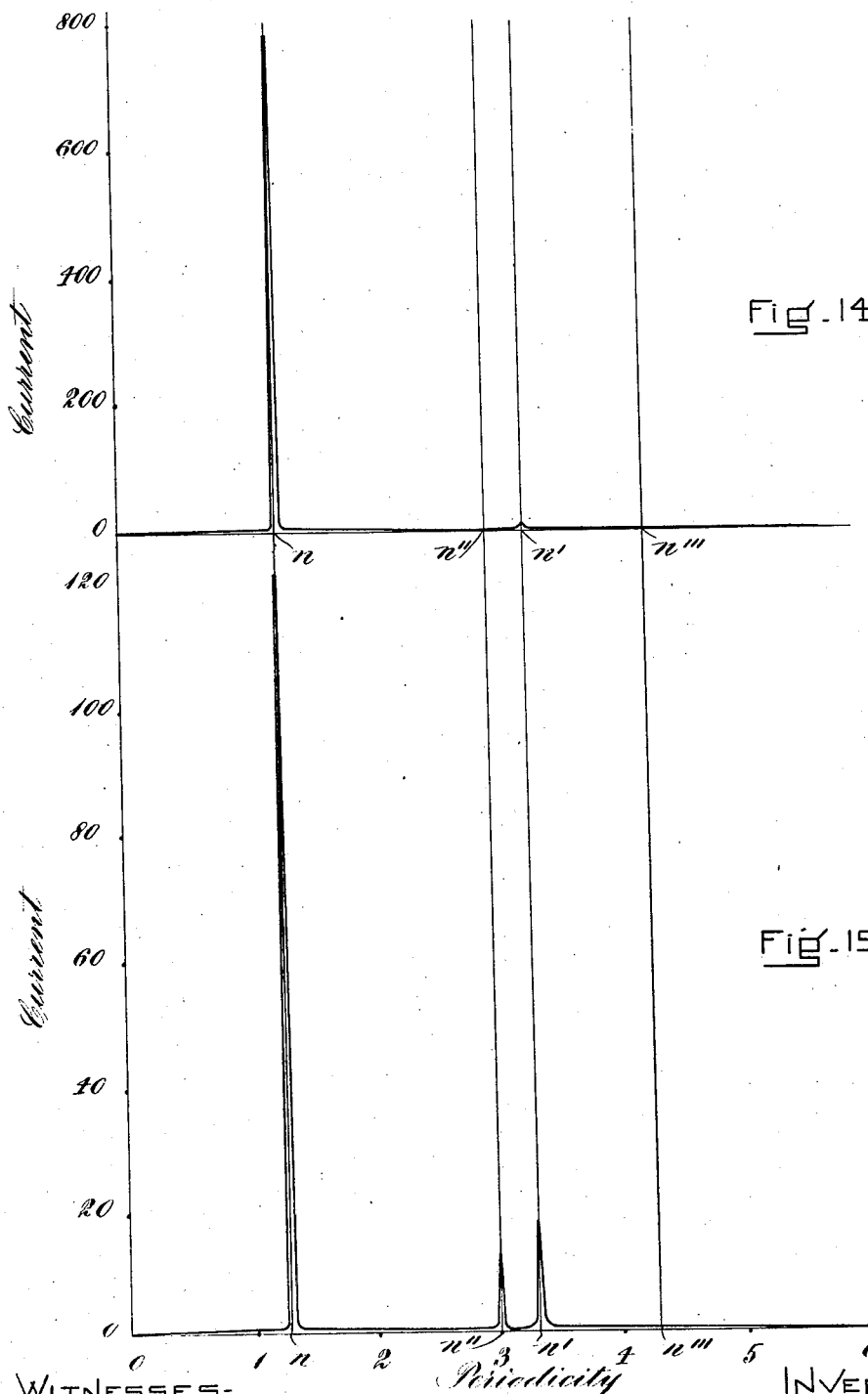

No. 884,107. PATENTED APR. 7, 1908.
J. S. STONE.
SPACE TELEGRAPHY.
APPLICATION FILED AUG. 3, 1906.
15 SHEETS—SHEET 11.
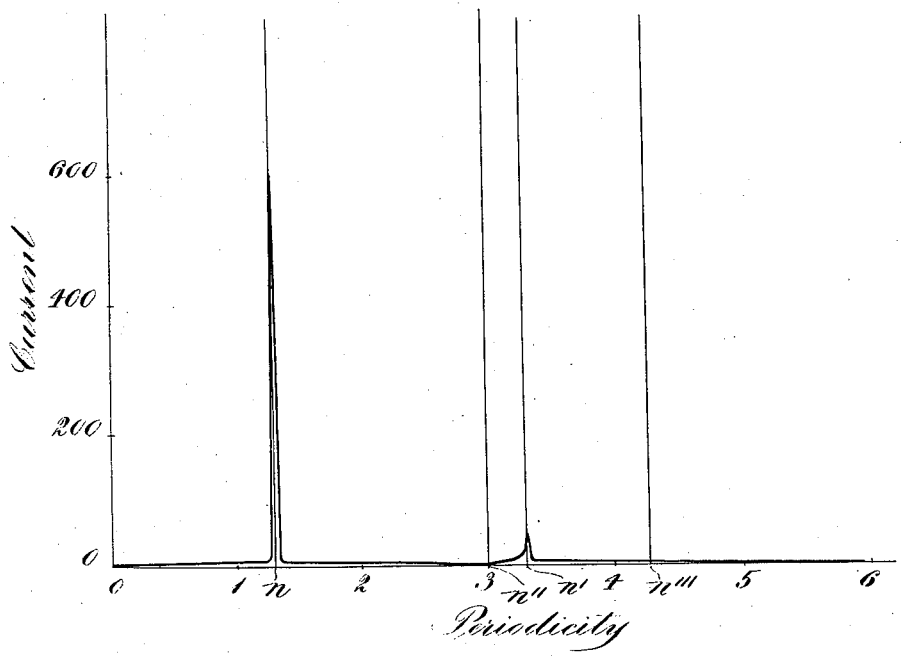
Fig_16_

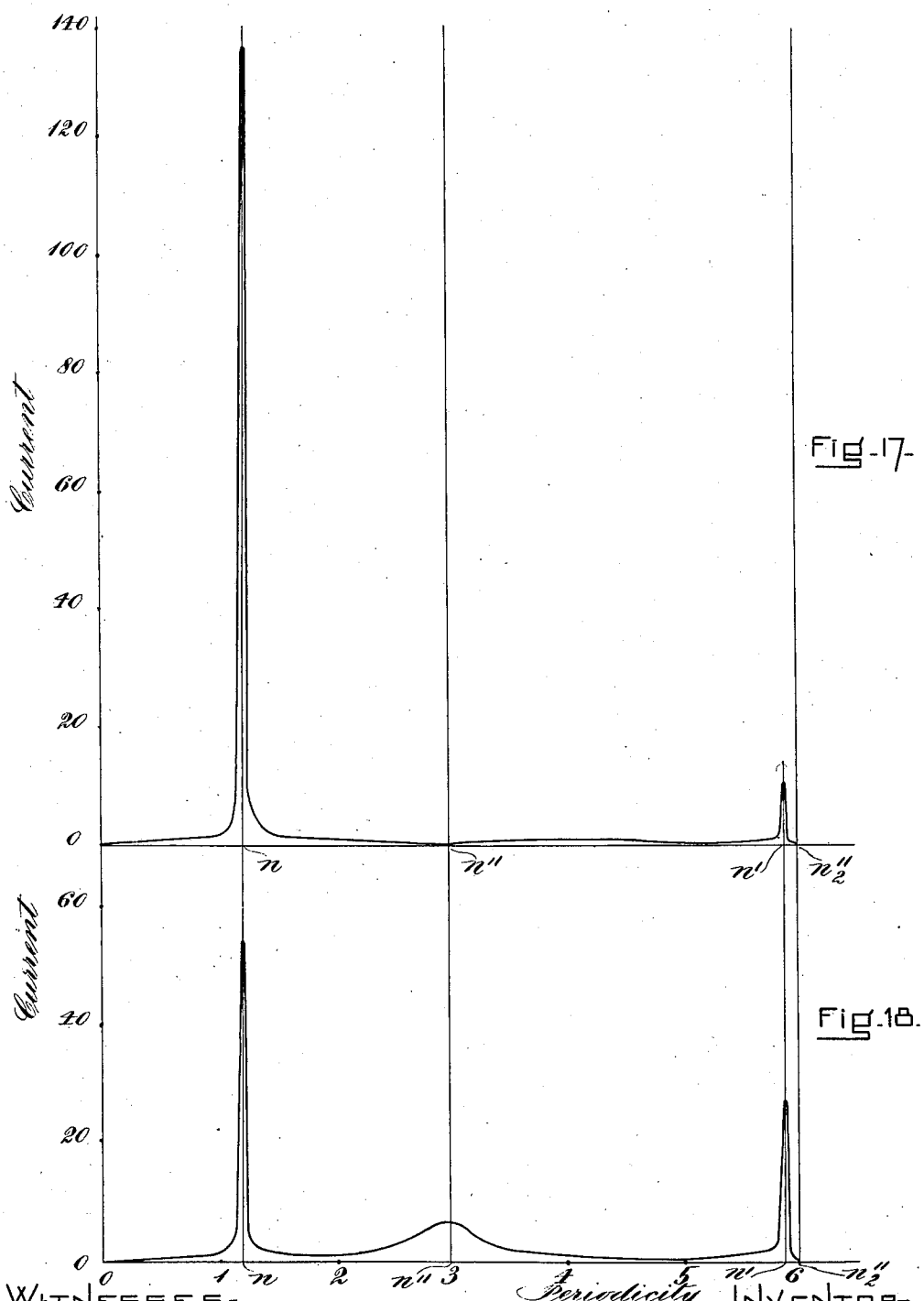

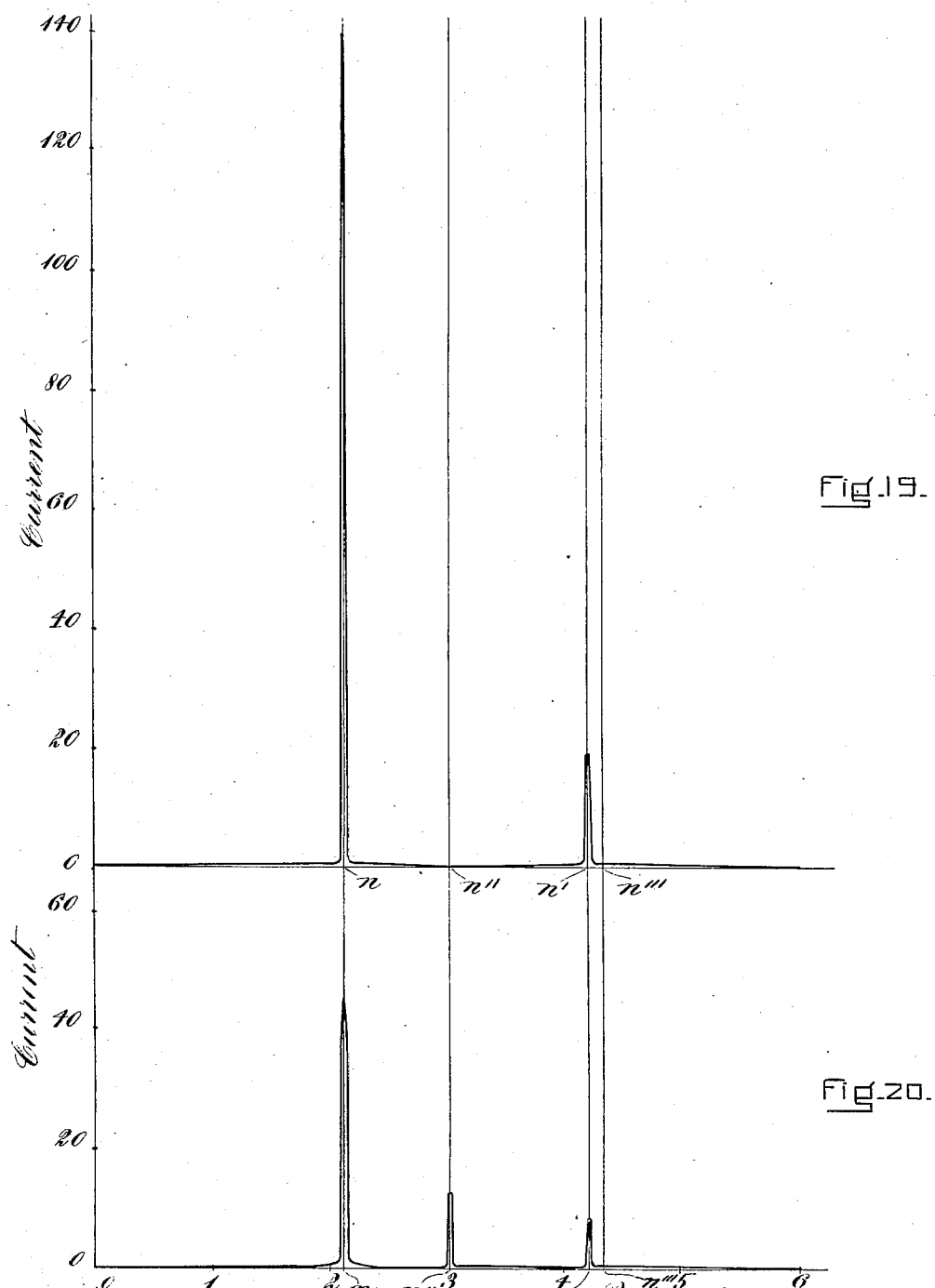

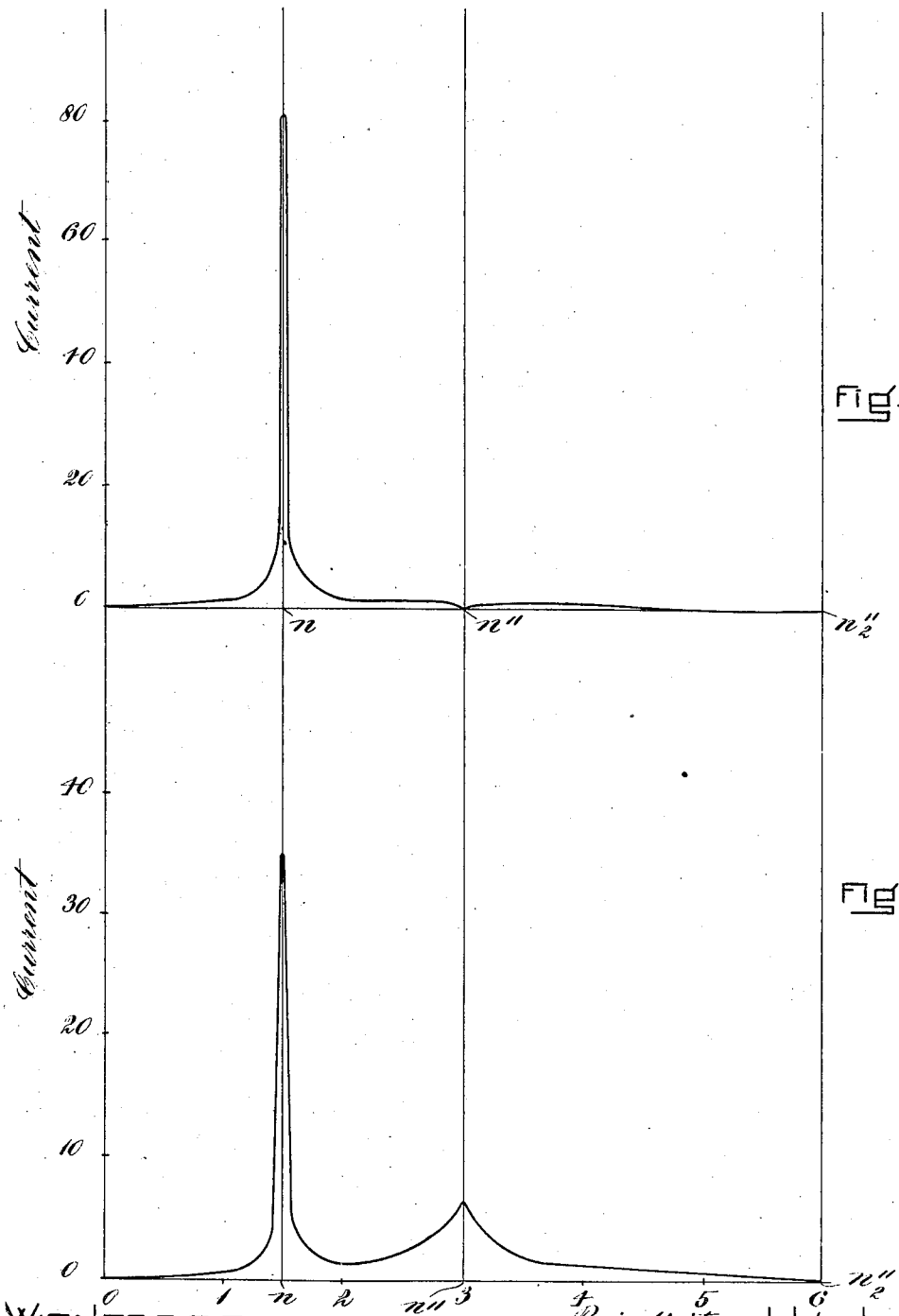

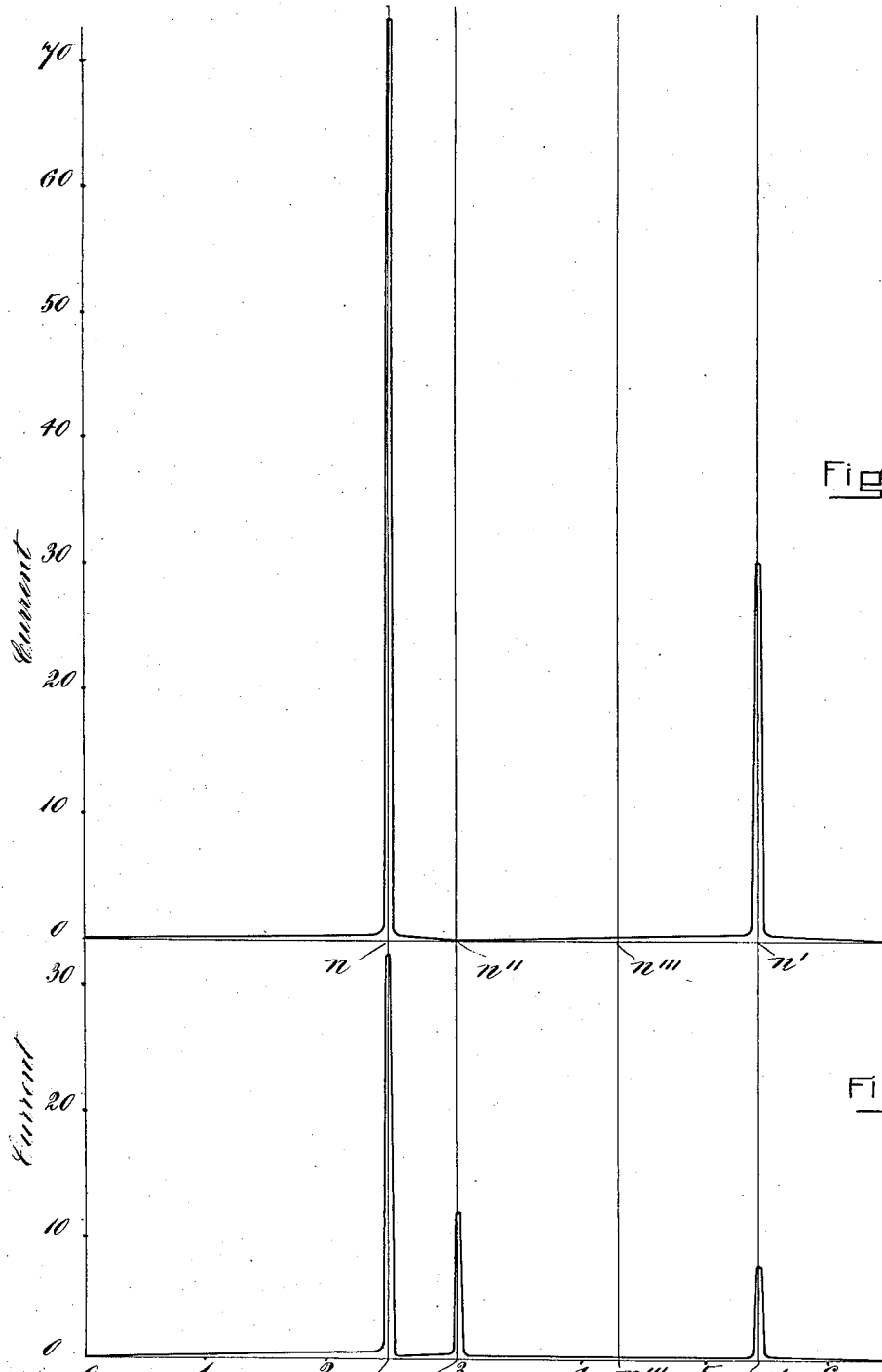

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

No. 884,107.

Specification of Letters Patent.

Patented April 7, 1908.

Application filed August 3, 1906. Serial No. 329,094.

*To all whom it may concern:*

Be it known that I, JOHN STONE STONE, a citizen of the United States, and a resident of Cambridge, in the county of Middlesex and State of Massachusetts, have invented a new and useful Improvement in Space Telegraphy, of which the following is a specification.

This invention relates to the art of transmitting intelligence from one station to another by means of electromagnetic waves without the use of wires to guide the waves to their destination; and it relates more particularly to systems for receiving signals transmitted by such waves.

The object of the present invention is to so adjust the elevated conductor system of a wireless or space telegraph receiving system relative to an associated tuned or resonant receiving circuit or circuits that, first, a persistent train of electromagnetic waves of a predetermined frequency impinging upon the elevated conductor shall cause the associated circuit or circuits to respond energetically; that, second, a persistent train of electromagnetic waves of frequency other than said predetermined frequency impinging upon the elevated conductor shall cause the associated tuned or resonant circuit or circuits to respond but feebly or not at all; and that, third, abrupt or impulsive electric forces acting upon the elevated conductor shall likewise produce but feeble response or no response at all in the associated tuned or resonant circuit or circuits.

The first and second objects of this invention may be attained by giving the elevated receiving conductor system a pronounced fundamental rate of vibration equal in frequency to that to which the tuned or resonant receiving circuit or circuits is attuned. The first and second objects of this invention may therefore be attained by placing a suitable inductance or capacity in the elevated conductor near its connection to earth, if it be an earthed elevated conductor, or at the center of the receiving conductor, if it be an unearthed conductor, as thereby the receiving conductor system will be given a pronounced and predetermined rate of vibration, much as a stretched string may be given a predetermined and more pronounced rate of vibration by the addition of a suitable load at its center. If, therefore, the loading inductance or capacity added be made such as to give the elevated conductor system a pronounced natural rate of vibration equal to the frequency to which the associated tuned or resonant receiving circuit or circuits is attuned, the first and second objects of the invention will be realized. This simple expedient, however, is not sufficient to accomplish the third object of the present invention, and for this purpose I may give the elevated conductor system a pronounced natural rate of vibration different from that to which the associated tuned or resonant receiving circuit or circuits is attuned while making the elevated conductor system highly responsive to persistent trains of waves of the frequency to which the associated tuned or resonant receiving circuit or circuits is attuned. For the purpose of accomplishing the third object of the present invention I may also provide means having for such natural vibrations as may by abrupt or impulsive electrical forces be created in the elevated conductor, practically zero reactance or, at least, an impedance low as compared to the impedance of the means by which the tuned or resonant receiving circuit or circuits is associated with the elevated conductor system, whereby such natural vibrations may be conducted to earth around such associating means and hence prevented from passing through said means and thereby producing even a feeble response in the aforesaid tuned or resonant receiving circuit or circuits.

In other words, I accomplish the objects of the present invention by giving the elevated conductor system a pronounced natural rate of vibration different from that of the waves the energy of which is to be received and, consequently, different from that to which the associated tuned or resonant receiving circuit or circuits is attuned; by making the elevated conductor system highly responsive to persistent trains of waves having the frequency of those the energy of which is to be received and, consequently, the frequency to which the associated tuned or resonant receiving circuit or circuits is attuned; and finally by conveying such natural oscillations as may be developed in the elevated conductor by extraneous electrical impulses of frequency different from that to which the tuned or resonant receiving circuit or circuits is attuned or such as may be developed therein by abrupt or impulsive electrical forces, to earth around the means whereby said tuned or resonant receiving circuit or circuits is associated with the elevated conductor system.

One of the several embodiments of my invention whereby the several above mentioned objects have been realized in practice consists of an elevated conductor system comprising a parallel branch circuit which includes capacity in one branch and inductance in the other branch, an elevated conductor and an earth connector; the elevated conductor and earth connector being connected in parallel with respect to said parallel branch circuit and each, when isolated, having zero reactance for the same frequency,—that is to say, the fundamental period of the elevated conductor, when isolated, being equal to the period of the earth connector, when isolated; and said parallel branch circuit having, for persistent electrical oscillations of the frequency of the waves the energy of which is to be received, a reactance equal in value and opposite in sign to the resultant reactance of the elevated conductor and its earth connector. The results are, that the earth connector determines the most pronounced natural rate of vibration of the elevated conductor system because, for either natural or forced electrical oscillations having such rate of vibration, the reaction of the parallel branch circuit upon the rest of the elevated conductor system is zero, said parallel branch circuit being shunted by the earth connector which for such oscillations has zero reactance and practically zero impedance; that the parallel branch circuit, by balancing the resultant reactance of the rest of the elevated conductor system for persistent electrical oscillations having the frequency of the waves the energy of which is to be received, renders said system highly responsive to persistent oscillations of such frequency; and, that the earth connector, having zero reactance and practically zero impedance for electrical oscillations having the frequency of the most pronounced natural rate of vibration of the elevated conductor system, conducts such natural oscillations as may be developed in the system to earth around said parallel branch circuit with which the resonant receiving circuit or oscillation detector may be associated.

The present invention is a development of those described in my United States Letters Patent Nos. 767,994, dated August 16, 1904, and 802,417, 802,421, 802,425 and 802,426, dated October 24, 1905, to which reference may be had for a more complete explanation of certain of the general principles involved in the present application than need be set forth herein.

My invention may best be understood by having reference to the drawings which accompany and form a part of this specification and which diagrammatically illustrate organizations of circuits and apparatus whereby the hereinbefore stated objects may conveniently be realized in practice.

Figure 2:
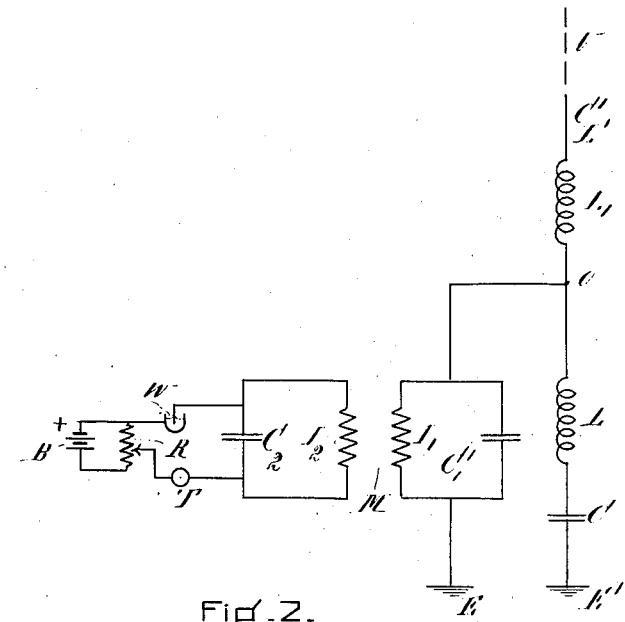
Figure 3:
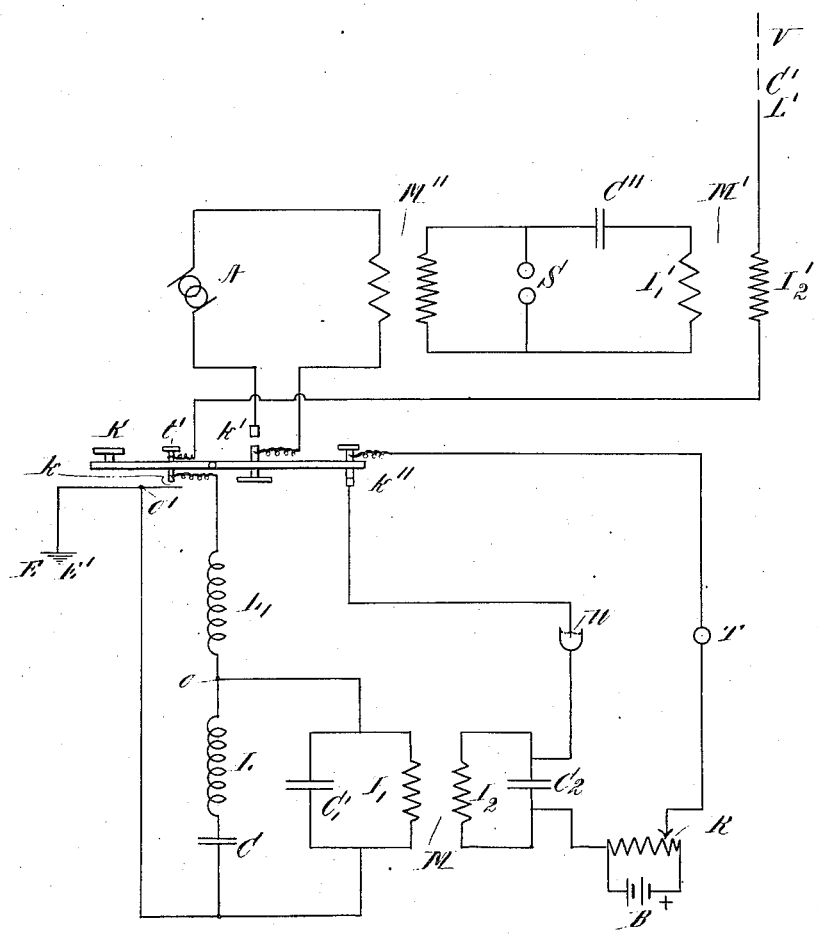

In the drawings Figure 1 is a diagram representing a space telegraph receiving system which embodies my invention in its simplest form. Fig. 2 is a diagram representing another and preferred form of my invention. Fig. 3 is a diagram representing a complete space telegraph transmitting and receiving system and showing one way in which my invention may be employed in practice. Figs. 4 to 24 inclusive show a set of curves drawn to rectangular coördinates, in which the ordinates represent reactances or current amplitudes and the abscissæ represent frequency, which illustrate the proportionment of the various electromagnetic constants of the several elements of the systems shown in Figs. 1, 2 and 3, and which illustrate also the mode of operation of the invention.

In the figures, V is an elevated conductor per se.

E E' are earth connections.

C $C_1'$ $C_2$ C'' are condensers.

L $L_1$ are inductance coils.

$I_1$ $I_2$ are the primary and secondary coils of the transformer M, and $I_1'$ and $I_2'$ are the primary and secondary coils of the transformer M', the primary and secondary coils in each instance being preferably so spatially related that the mutual energy between the primary and secondary circuits is small as compared with the product of the self energies of said circuits.

W is an oscillation detector of any suitable construction and is herein shown as consisting of a Wollaston anode immersed in an electrolyte.

T is a signal-indicating device which may be a telephone receiver.

B is a battery and R is an adjustable resistance, said battery and resistance constituting a potentiometer.

A is a source of vibratory electric current herein shown as an alternating current generator.

M'' is a high potential transformer.

K is a transmitting key.

The three essential elements of my invention are the elevated conductor Vo, the earth connector oE' and the parallel branch circuit $I_1$ $C_1'$. My invention resides in the arrangement of the aforesaid elements and in the proportionment of their electromagnetic constants whereby the foregoing objects may be realized.

Vo is an elevated conductor consisting, in Fig. 1, of an elevated conductor per se, in Fig. 2, of an elevated conductor per se and the serially connected inductance coil $L_1$ and, in Fig. 3, of an elevated conductor *per se* and the two serially connected inductance coils $I_2'$, $L_1$.

$oE'$ is an earth connector having, in all cases, zero reactance for the same frequency for which the elevated conductor $Vo$ has zero reactance, so that for natural oscillations of a frequency equals to the most pronounced natural rate of vibration of the elevated conductor system, the point $o$ is a point having practically zero potential to earth.

$I_1 C_1'$ is a parallel branch circuit having for persistent electrical oscillations of the frequency to which the resonant receiving circuit $C_2 I_2$ is attuned, a reactance equal and opposite to the resultant reactance of the elevated conductor $Vo$ and earth connector $oE'$, which are connected in parallel with respect to the system $o I_1 C_1' E$.

The system $o I_1 C_1' E$ together with the elevated conductor $Vo$ and earth connector $oE'$, which are connected in parallel with respect to the system $o I_1 C_1' E$, constitutes the elevated conductor system. For persistent electrical oscillations of the frequency to which the resonant receiving circuit $C_2 I_2$ is attuned, said elevated conductor system has zero reactance, the resultant reactance of the two components $Vo$ and $oE'$ of said elevated conductor system being balanced by the reactance of the parallel branch circuit $I_1 C_1'$.

In Figs. 1, 2 and 3, $C'$ represents the apparent capacity of the vertical, or elevated conductor *per se*, from the upper end thereof to the point $o$. $L'$ represents the apparent inductance of the vertical, or elevated conductor *per se*, from the upper end thereof to the point $o$. In the earth connector $oE'$, the coil $L$ and condenser $C$ may be so chosen that for persistent electrical oscillations of frequencies from zero to approximately the fundamental of the elevated conductor $Vo$, the reactance of $oE'$ is the same in sign and is approximately the same in value as the reactance of the elevated conductor $Vo$; and $Vo$ and $oE'$, when isolated, each has zero reactance for oscillations of the lowest frequency natural to the elevated conductor. In other words, although it cannot be said that the lumped inductance of the coil $L$ is equal in its effect to the distributed inductance of the vertical, or that the lumped capacity of the condenser $C$ is equal in its effect to the distributed capacity of the vertical, nevertheless the reactance of the earth connector between the above mentioned limits simulates as near as may be the reactance of the elevated conductor, and the reactance of each is zero for the same frequency. However, I prefer to make the selectance function of the earth connector for a given frequency equal to that of the elevated conductor $Vo$ for such frequency by any means which will make the function $\sqrt{\dfrac{L}{CR^2}}$ of $oE'$ equal to the corresponding function of $Vo$.

The circuit $C_2 I_2$ is a resonant receiving circuit attuned to the frequency of the waves the energy of which is to be received and associated in the present instance with the inductance branch of the parallel branch circuit. The oscillation detector $W$ and the local circuit including the same may be associated with said resonant receiving circuit in any suitable manner and in the present instance said circuit is shown as connected across the terminals of the condenser $C_2$.

In the manner more fully set forth by me in my Letters Patent No. 767,994, hereinbefore referred to, the parallel branch circuit $I_1 C'_1$ gives the entire elevated conductor system shown in said Letters Patent natural rates of vibration different from that of the waves the energy of which is to be received while for a persistent simple harmonic force having the frequency of said waves, the reactance of the parallel branch circuit balances the reactance of the rest of the elevated conductor system and thereby makes said system highly responsive to persistent forces of said frequency. In the systems described in said Letters Patent, the natural oscillations developed in the elevated conductor system are of frequencies ill adapted to cause a response of the associated resonant receiving circuit by passing to earth through the parallel branch circuit with which said resonant circuit is associated, on account of the high impedance offered by said associated resonant receiving circuit to oscillations of such frequencies. Such natural oscillations, however, pass to earth through the parallel branch circuit and if they are of sufficiently high intensity they may produce a noticeable response of the associated resonant receiving circuit unless the mutual inductance between said parallel branch circuit and said associated resonant circuit be made excessively small.

The particular improvement effected by the present invention over the state of the art as shown by my hereinbefore mentioned Letters Patent consists in obviating even a tendency for said natural oscillations to pass through said parallel branch circuit and thereby effect the response of the associated resonant receiving circuit. To this end I may employ means whereby the elevated conductor system is given natural rates of vibration different from that of the associated resonant receiving circuit and whereby said system is made highly responsive to persistent trains of waves of the frequency to which the resonant receiving circuit is attuned, said means comprising preferably the parallel branch circuit $I_1 C_1'$ and the earth connector $oE'$; and I may also employ means for preventing such natural oscillations as may by extraneous forces be created in the elevated conductor from passing through said parallel branch circuit, said latter means comprising preferably the earth connector $oE'$ which, for oscillations having a frequency equal to the most pronounced natural rate of vibration of the elevated conductor system, has zero reactance and practically zero impedance or, at least, an impedance low as compared to the impedance offered by the parallel branch circuit to such natural oscillations. It will be seen therefore that the elevated conductor system is so designed that the frequencies of the natural oscillations which are created in said system by abrupt or impulsive electrical forces may be made different from the frequency to which the resonant receiving circuit is attuned, that said system may be made highly responsive to persistent electrical forces of the frequency to which said resonant receiving circuit is attuned and that, for oscillations of the frequency which is the same as the gravest natural rate of vibration of the system, the reactance of the elevated conductor $Vo$ and earth connector $oE'$, as well as the reactance of the system $VoE'$, is zero.

Having set forth in general the fundamental principles of my invention I shall now describe specifically those particular embodiments of my invention which are illustrated in the drawings accompanying this application, although it will be understood that I do not limit myself to such particular embodiments of the present invention inasmuch as many modifications may be made therein by those skilled in the art without departing from the principle or spirit of my invention. In order that the particular embodiments of my invention which I have selected for diagrammatic illustration for the purpose of more fully disclosing the same, may be described with sufficient particularity to enable those skilled in the art to make and use the same, it will be necessary to refer to the curves shown in Figs. 4 to 24 inclusive.

Two general cases of my invention may be considered,—one (called Case I) in which the elevated conductor does not include a serially connected inductance, and the other (called Case II) in which the elevated conductor includes the serially connected inductance $L_1$ or inductances $I_2'$ and $L_1$; and each of said general cases may in turn be divided into three special cases,—viz., that in which the frequency natural to the parallel branch circuit is lower than the fundamental of the elevated conductor (Case $a$), that in which the frequency natural to the parallel branch circuit is equal to the fundamental of the elevated conductor (Case $b$), and that in which the frequency natural to the parallel branch circuit is higher than the fundamental of the elevated conductor (Case $c$).

Figs. 4 to 10 inclusive relative to Case I$^a$; Figs. 11 to 16 relate to Case II$^a$; Figs. 17 and 18 relate to Case I$^b$; Figs. 19 and 20 relate to Case II$^b$; Figs. 21 and 22 relate to Case I$^c$; and Figs. 23 and 24 relate to Case II$^c$.

Figure 4:
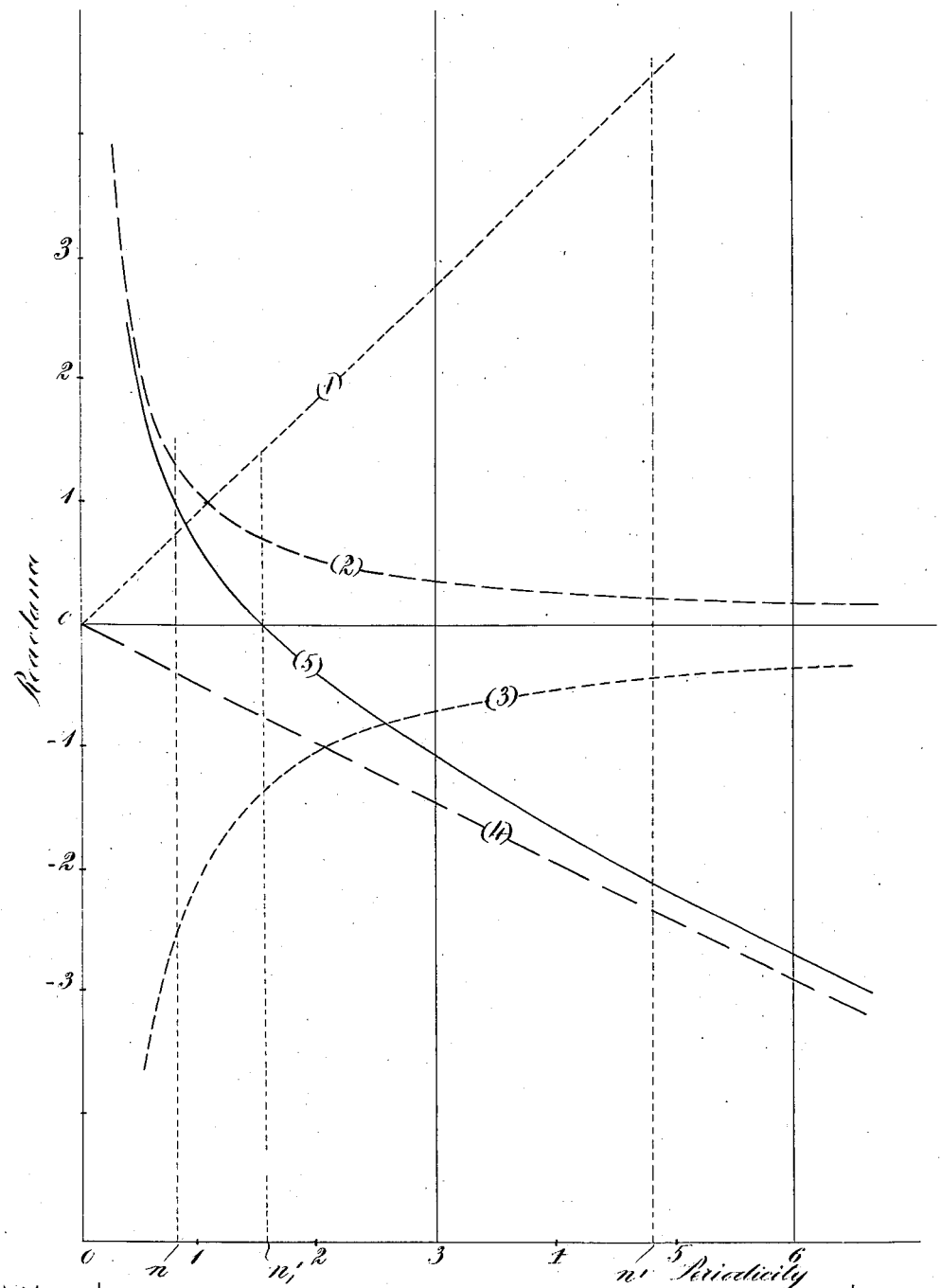
Figure 5:
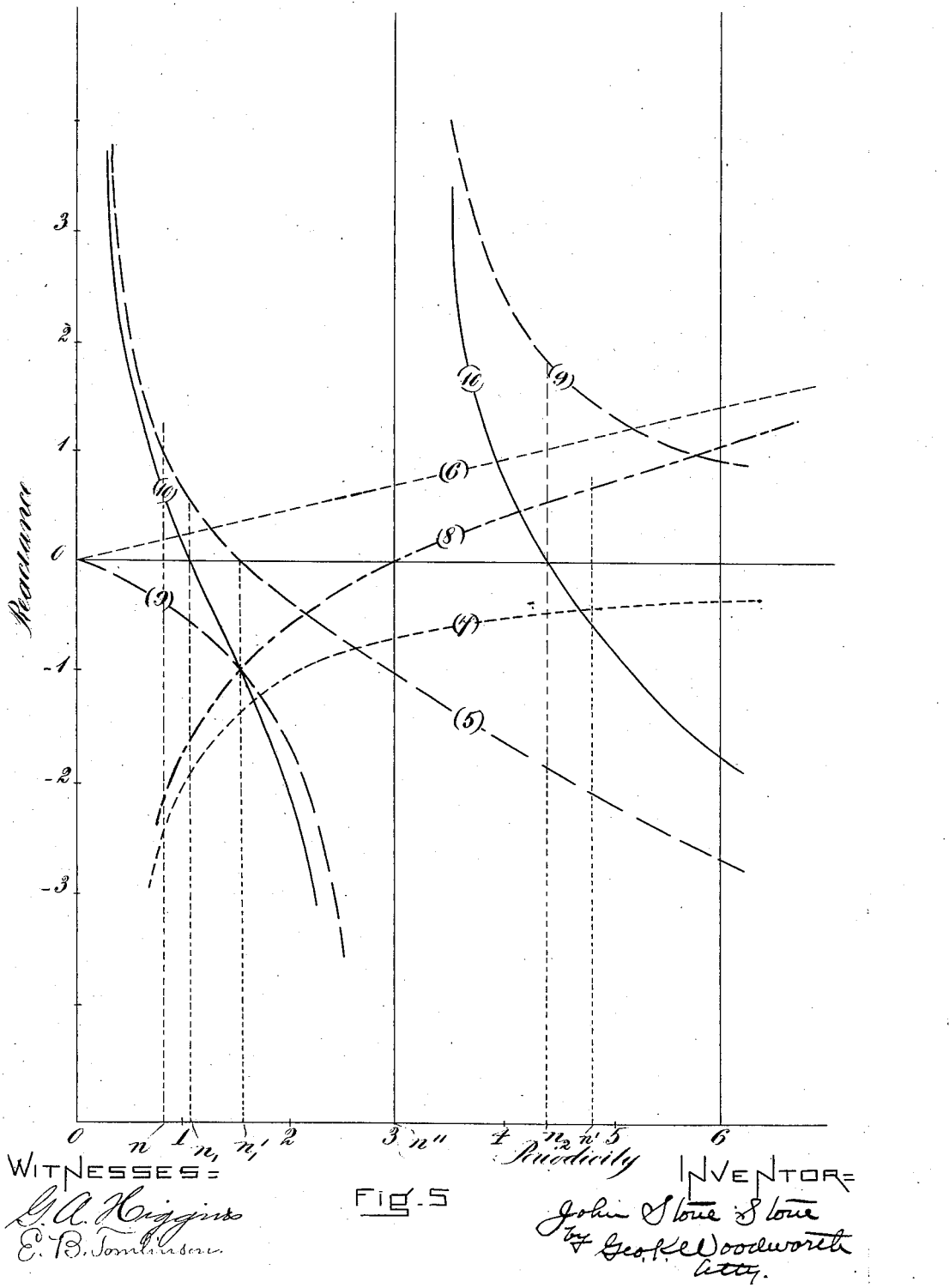
Figures 6, 7:
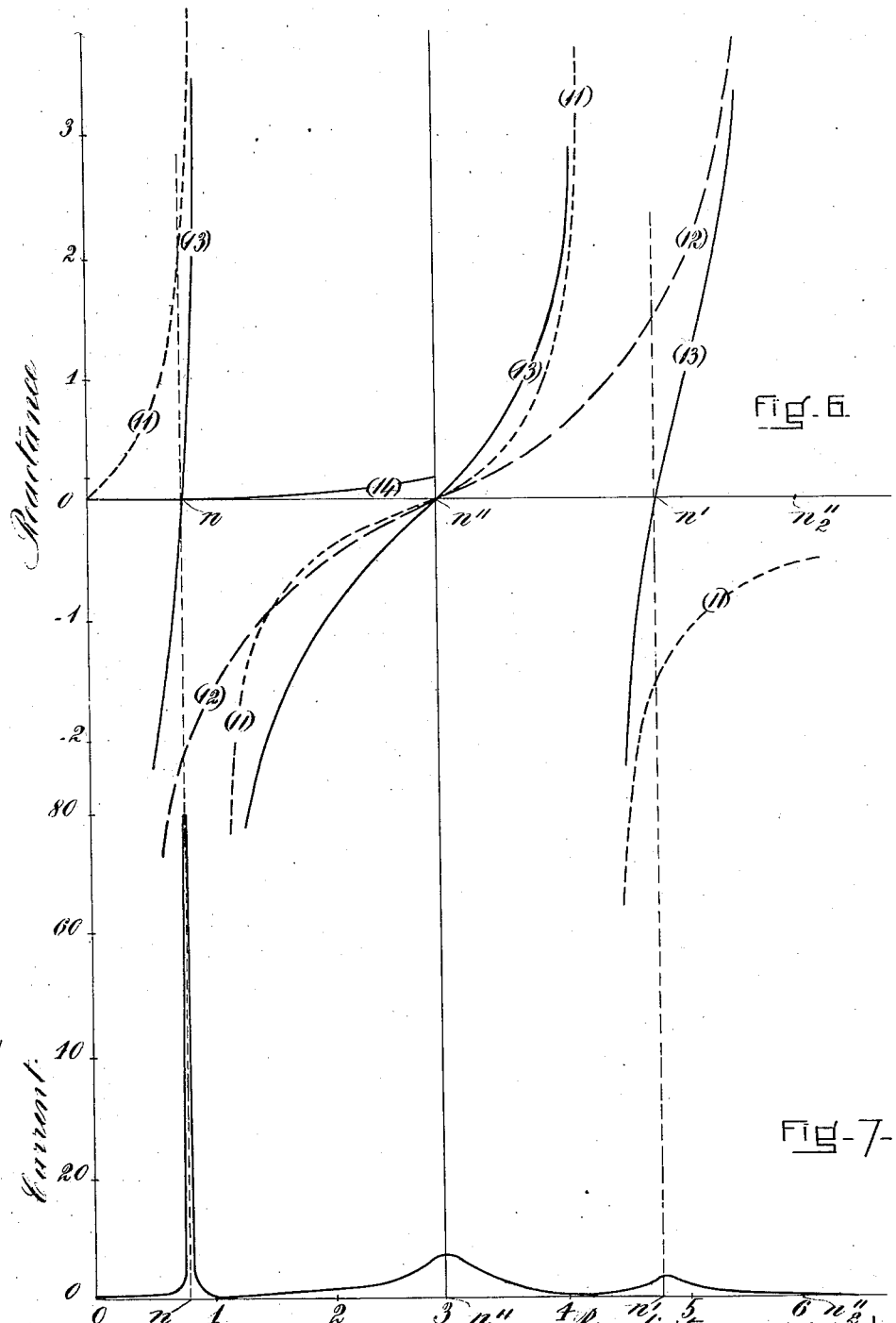

Figs. 4 to 6 inclusive show the variation with frequency for persistent electrical forces of the reactance of the several components of the system shown in Fig. 1; Figs. 11 and 12 show the variation with frequency for persistent electrical forces of the reactance of the several components of the systems illustrated in Figs. 2 and 3; and Figs. 7 to 10 and 13 to 24 show the variation with frequency for persistent electrical forces of the current amplitudes in the several parts of the elevated conductor system.

While the relations shown herein between the selectance functions and the frequencies respectively of the earth connector and parallel branch circuit are not intended in the nature of limitations of the present invention, for the purpose of conveniently representing in Figs. 4 to 6 and 11 and 12 the various relations shown therein, I have chosen the electromagnetic constants of the parallel branch circuit so that the selectance function of said circuit is equal to four times that of the earth connector and the frequency of said circuit is equal to one-half that of the earth connector. In all cases the frequency natural to the earth connector is equal to the fundamental frequency of the elevated conductor $Vo$, whether or not the coil or coils $L_1$, or $I_2'$ and $L_1$, be used.

In the following discussion of the curves shown in Figs. 4 to 6 and 11 and 12 it is to be understood that while said curves give the values of reactances whereby the several component parts of the system may be designed, I do not limit myself to systems, the component parts of which necessarily have the reactances shown in said curves inasmuch as an infinite number of systems may be designed in accordance with the principle of the present invention, the component parts of which would have reactances which were vastly different from those shown in said curves. So far from limiting myself to systems designed according to the aforesaid curves, I consider said curves as merely illustrative of two special cases, that is to say, Figs. 4 to 6 are illustrative of one specific case falling within the general case designated as Case I$^a$, and Figs. 11 and 12 are illustrative of one specific case falling within the general case designated as Case II$^a$.

The reactance of the elevated conductor system at the point o may most conveniently be found by adding the conductances of the earth connector and parallel branch circuit and then adding the reactance of the elevated conductor at the point o to the reciprocal of such joint conductance—i. e., the joint reactance, thereby obtaining the total reactance. For convenience the term "conductance" is used herein as meaning the reciprocal of reactance.

Curve (1) in Fig. 4 shows the reactance-frequency variation of the inductance branch $I_1$ of the parallel branch circuit and curve (2) shows the conductance-frequency variation thereof.

Curve (3) shows the reactance-frequency variation of the condenser branch $C_1'$ of the parallel branch circuit and curve (4) shows the conductance-frequency variation thereof.

Curve (5) being the algebraic sum of curves (2) and (4) represents the variation with frequency of the joint conductance of the two branches of the parallel branch circuit, or the total conductance of said parallel branch circuit. The point $n_1'$ at which curve (5) crosses the axis of abscissæ therefore represents the frequency natural to the parallel branch circuit, when isolated, and for persistent electrical forces of said frequency the reactance of the parallel branch circuit as measured between its points of connection with the circuit upon which such forces are impressed is practically infinite.

Curve (6) in Fig. 5 shows the reactance-frequency variation of the coil L of the earth connector and curve (7) shows the reactance-frequency variation of the condenser C thereof. Curve (8) being the algebraic sum of curves (6) and (7) accordingly represents the variation with frequency of the total reactance of the earth connector. The point $n''$ at which curve (8) crosses the axis of abscissæ represents the frequency natural to the earth connector when isolated.

Curve (9) being the reciprocal of curve (8), shows the conductance-frequency variation of the earth connector. Curve (10) being the sum of curves (5) and (9) represents the variation with frequency of the joint conductance of the parallel branch circuit and the earth connector. $n_1$ and $n_2$ being the points at which the curve (10) crosses the axis of abscissæ represent the frequencies natural to the system consisting of the parallel branch circuit and the earth connector.

Curve (11) in Fig. 6 represents the reciprocal of curve (10) and shows therefore the variation with frequency of the joint reactance of the system consisting of the parallel branch circuit and the earth connector.

Curve (12) represents the variation with frequency of the reactance of the elevated conductor Vo, in Fig. 1, as measured at its electrical center, i. e., as measured at the point o.

Curve (13) which is the algebraic sum of curves (11) and (12) represents the variation with frequency of the total reactance of the elevated conductor system as measured at the point o. Curve (13) crosses the axis of abscissæ at three points, namely, $n$, $n''$ and $n'$. For electrical oscillations of frequencies $n$, $n''$ and $n'$, therefore, the reactance of the elevated conductor system is zero.

$n$ represents the frequency of the waves the energy of which is to be received and to which the resonant receiving circuit is attuned, and for persistent electrical forces of this frequency the reactance of the parallel branch circuit is equal in value and opposite in sign to the resultant reactance of the elevated conductor Vo and its earth connector $oE'$ which are connected in parallel with respect to said parallel branch circuit.

$n''$ represents the fundamental frequency natural to the elevated conductor Vo, when isolated, and $n_2''$ is the first even harmonic thereof. $n''$ represents also the frequency natural to the earth connector $oE'$, when isolated. Furthermore $n''$ represents the most pronounced and gravest natural rate of vibration of the elevated conductor Vo and earth connector $oE'$ connected in series and isolated; and finally $n''$ represents the gravest and most pronounced natural rate of vibration of the elevated conductor system considered as a whole,—i. e., Vo and $oE'$ connected in series with each other and in parallel with respect to $oE$,—because for oscillations, either natural or forced, of frequency $n''$ the parallel branch circuit does not react upon the system Vo $E'$, said parallel branch circuit being shunted by the earth connector which for oscillations of frequency $n''$ has zero reactance and practically zero impedance. Accordingly electrical oscillations of frequency $n''$ which are developed in the elevated conductor pass to earth by way of the earth connector and have no tendency to pass to earth through either branch of the parallel branch circuit. The natural oscillations which are developed in the elevated conductor by abrupt or impulsive electrical forces are chiefly of frequency $n''$, or in other words the most pronounced natural rate of vibration of the elevated conductor system is determined by the earth connector and is not affected by the parallel branch circuit.

$n'$ represents the frequency of the next highest natural rate of vibration of the elevated conductor system. Natural oscillations of frequency $n'$ which may be developed in the elevated conductor by extraneous electrical forces have little tendency to effect the response of the associated resonant receiving circuit for they are widely separated in frequency from the frequency to which said resonant circuit is attuned, and they have practically no tendency to pass through the inductance branch of the parallel branch circuit which, as shown by curve (1) in Fig. 4, has an enormous reactance for oscillations of frequency $n'$.

The resistance equivalent of radiation of an elevated conductor is the equivalent in ohmic resistance of the damping or dissipative effect of the radiation from said elevated conductor and it represents the value of the ohmic resistance necessary, under a given condition, to effect the same dissipation of the energy of the elevated conductor as is effected by the radiation of the energy of said elevated conductor in the form of electromagnetic waves. The resistance equivalent of radiation of an unloaded elevated conductor vibrating at its fundamental is 40 ohms, irrespective of its geometric or electromagnetic constants. Curve (14) shows the variation with frequency of the resistance equivalent of radiation of the elevated conductor $Vo$ in Fig. 1, and the ordinate of curve (14) for frequency $n''$ is 40. This value fixes the scale of ordinates for the other curves shown in Figs. 4, 5 and 6. The abscissæ of said curves are expressed as arbitrary numbers 1, 2, 3 etc., and these numbers may be multiplied by the proper constant, such as $2.10^5$, $10^6$, $3.10^6$ etc., to suit the ordinary working conditions of wireless telegraph practice.

The curve in Fig. 7 shows the variation with frequency for persistent electrical forces of the amplitude of current developed in the elevated conductor $Vo$ of Fig. 1 at a point slightly above the point $o$ therein. For oscillations of frequency $n$ there is a well defined current maximum while for oscillations of frequencies $n''$ and $n'$ there are current maxima which are not so well defined as that occurring for frequency $n$ and which are of relatively small amplitude. The reason that the maxima which occur at frequencies $n''$ and $n'$ are smaller in amplitude than that which occurs at frequency $n$ is that for frequencies $n''$ and $n'$ the resistance equivalent of radiation is very much larger than it is for frequency $n$.

The curve in Fig. 8 shows the variation with frequency for persistent electrical forces of the amplitude of the current developed in the inductance branch of the parallel branch circuit. For frequency $n$, which is that of the waves the energy of which is to be received, there is a well defined current maximum in said inductance branch; for frequency $n''$ the current in said inductance branch is zero because as above pointed out the earth connector $oE'$ which is connected in shunt to the parallel branch circuit has zero reactance for oscillations of frequency $n''$; for frequency $n'$ a very small and ill defined maximum of current is found in said inductance branch because as above pointed out, and as shown in curve (1), the reactance of said inductance branch for oscillations of frequency $n'$ is very large.

The curve in Fig. 9 shows the variation with frequency for persistent electrical forces of the amplitude of the current developed in the earth connector. While a well defined and in fact relatively large current maximum occurs at frequency $n$, nevertheless said amplitude is less than one-third of that which for said frequency is developed in the inductance branch of the parallel branch circuit owing to the fact that the reactance of the earth connector is, in this particular instance, more than three times as large as that of the inductance branch of said parallel branch circuit as may be seen by comparing the ordinate of curve (1) for frequency $n$ with the ordinate of curve (8) for said frequency. The curve shown in Fig. 9 exhibits maxima also for frequencies $n''$ and $n'$, the earth connector having zero reactance for the frequency $n''$ and having a relatively small reactance for frequency $n$. In fact it will be noted by reference to curve (8) that for frequency $n'$ the reactance of the earth connector is very much smaller than that of the inductance branch of the parallel branch circuit for said frequency as shown by curve (1).

The curve in Fig. 10 shows the variation with frequency for persistent electrical forces of the amplitude of the current developed in the condenser branch of the parallel branch circuit. This curve shows a well defined maximum for frequency $n$ while for frequency $n''$ the current is shown to be zero, the parallel branch circuit as above explained being shunted by a path having zero reactance for said frequency, namely, the earth connector. The curve in Fig. 10 also shows a relatively small maximum for frequency $n'$.

The elevated conductor $Vo$ and earth connector $oE$ being connected in parallel in respect to the parallel branch circuit, it will be noted that the sum of the currents in said elevated conductor and earth connector is equal to the vector sum of the currents in the inductance and condenser branches of said parallel branch circuit, i. e., is equal to the current in the circuit $oE$.

In Figs. 26$^a$ and 28 of my Letters Patent No. 767,994 above referred to are shown curves somewhat similar in shape to the curve shown in Fig. 7 of the present case and representing the variation with frequency for persistent electrical forces of the current amplitudes in the elevated conductor. In the system disclosed in said Letters Patent natural oscillations created in the elevated conductor system by extraneous electrical forces tend to pass to earth through the parallel branch circuit $I_1 C_1'$, as indicated at $n'$ in Fig. 24$^a$ of said patent. In the present invention, however, the circuit $oE'$ connected between the earth and the point of association of the parallel branch circuit with the vertical constitutes a path of practically zero reactance for any natural oscillations of frequency $n''$ that may be created in the elevated conductor by such extraneous forces because, for such natural oscillations so created, the reaction of the parallel branch circuit upon the system $Vo\ E'$ is zero, so that said oscillations have no tendency to pass to earth by way of the parallel branch circuit and therefore have no tendency to cause a response of the resonant receiving circuit which may be associated with said parallel branch circuit. For such natural oscillations of said frequency so created in the elevated conductor by extraneous electrical forces, the parallel branch circuit and especially the inductance branch thereof has a reactance very high as compared to that of the circuit $oE'$ as shown in Figs. 4 and 5 or, in other words, the circuit $oE'$ affords a path to earth around said parallel branch circuit of practically zero impedance for such natural oscillations of said frequency, so that said natural oscillations have practically no tendency to pass to earth by way of said parallel branch circuit and especially by way of the inductance branch thereof. For persistent electrical forces of frequency $n$ the circuit $oE'$ has a reactance very high as compared to that of the parallel branch circuit and especially as compared to the inductance branch thereof, as shown in Figs. 4 and 5, so that there is but little tendency for persistent oscillations of frequency $n$, i. e., the frequency of the waves the energy of which is to be received, to pass to earth by way of said circuit $oE'$.

As shown in Figs. 1, 2 and 3 the oscillation detector W is associated with the elevated conductor by means of the parallel branch circuit $I_1\ C_1'$ through the intermediary of the resonant receiving circuit $C_2\ I_2$; but I do not limit myself to such means for associating said oscillation detector with said elevated conductor inasmuch as other means will readily suggest themselves to those skilled in the art. It will be seen therefore that my invention comprises an elevated receiving conductor $Vo$, an oscillation detector W, means associating said oscillation detector with said elevated conductor, said means being shown in the present instance as the parallel branch circuit $I_1\ C_1'$, and a circuit connected around said parallel branch circuit, said circuit being shown in the present instance as the earth connector $oE'$. It will be seen also that in the present instance, the inductance branch of said parallel branch circuit has, for persistent electrical oscillations of frequency $n$, a reactance smaller than that of said earth connector, while for such natural oscillations as may be created in the elevated conductor said earth connector has a reactance smaller than that of the inductance branch of said parallel branch circuit. Furthermore it will be seen that my invention comprises a circuit, herein shown as the parallel branch circuit $I_1\ C_1'$, an elevated conductor $Vo$ and an earth connector $oE'$, said elevated conductor and earth connector being connected in parallel with respect to said circuit and that, by virtue of the proportionment of the reactances of the various components of the system as hereinbefore set forth, the system as a whole has zero reactance for oscillations of a frequency equal to the fundamental frequency of the elevated conductor $Vo$, viz., the frequency $n''$, and has zero reactance for two other frequencies, one of which $n'$ is higher and the other $n$ is lower than said fundamental frequency $n''$; that currents of frequency $n$, which is the frequency of the waves the energy of which is to be received, pass chiefly through the inductance branch of the parallel branch circuit with which branch the oscillation detector preferably is associated; that currents of frequency $n''$ pass to earth entirely through the earth connector and therefore do not affect said oscillation detector; and that currents of frequency $n'$ pass to earth partly through the earth connector and partly through the two branches of the parallel branch circuit. The greater portion of said currents of said frequency $n'$, however, pass through the condenser branch of the parallel branch circuit (see Figs. 8 and 10) because the frequency $n'$ is always higher than the frequency $n_1'$ which is natural to the parallel branch circuit when isolated as shown by curve (5), so that natural oscillations of frequency $n'$ and of higher frequencies,—the curve (12) which shows the reactance-frequency variation of the elevated conductor *per se* being a discontinuous curve,—have no tendency to effect the response of the oscillation detector. It is particularly to be observed that the oscillations of frequency $n'$ are very much higher in frequency than that to which the associated resonant circuit $C_2\ I_2$ is attuned, and that therefore said oscillations will have but little tendency to effect the response of said resonant circuit.

Finally attention is called to the fact that the means whereby the reaction of the parallel branch circuit upon the elevated conductor system is rendered zero for oscillations of frequency $n''$, so that no currents of said frequency pass through either branch of said parallel branch circuit, is the earth connector $oE'$ which for said frequency has zero reactance and practically zero impedance; and that, although the reactance of the earth connector is not zero for oscillations of frequency $n'$, the reactance of the parallel branch circuit for oscillations of said frequency is negative, so that currents of said frequency pass to earth chiefly through the condenser branch of said parallel branch circuit.

The elevated conductor systems shown in Figs. 2 and 3 are the same in all respects as that shown in Fig. 1, except that in Figs. 2 and 3 the elevated conductor consists of the loaded vertical V$o$. In Fig. 2, $L_1$ is a serially connected inductance employed for making the elevated conductor V$o$ electrically stiffer, i. e., for making the selectance function of V$o$ higher, than in the system shown in Fig. 1. In Fig. 3, $I_2'$ is the secondary of the transformer, the primary of which is included in the sonorous circuit S C'' $I_1'$, and the inductance of the coil $I_2'$ added to that of the coil $L_1$ serves to increase the selectance function of the elevated conductor V$o$. In considering Fig. 3 which shows the application of the present invention to a complete transmitting and receiving system, the sum of the inductances $I^{2'}$ and $L_1$ may be regarded as equal to the inductance of the coil $l_1$ of Fig. 2 so that the curves shown in Figs. 11 and 12 apply to Fig. 3 as well as to Fig. 2.

The curves shown in Figs. 11 and 12 represent the reactance-frequency variations of the several components constituting Figs. 2 and 3, which figures show one special case falling within the general case above referred to as Case II$^a$. For the purpose of more readily comparing the reactance-frequency curves shown in Figs. 11 and 12 with those shown in Fig. 6 for Case I$^a$, and the current-frequency curves shown in Figs. 13 to 16 with those shown in Figs. 7 to 10 for Case I$^a$, the fundamental $n''$ of the loaded vertical of Figs 2 and 3 is made equal to the fundamental of the unloaded vertical of Fig. 1 or, in other words, the fundamental of the elevated conductor per se of Figs. 2 and 3 is taken as higher than that of the elevated conductor per se of Fig. 1. It will be understood of course that I am not limited to any particular relation between the fundamentals of the elevated conductors per se of Cases I$^a$ and II$^a$ and that the foregoing proportionment has been been made merely for the purpose of conveniently representing the two cases. In Fig. 11 the fundamental of the elevated conductor per se is designated as $n'''$ and its first even harmonic is shown at $n_2'''$.

Curve (15) shows the reactance-frequency variation of the inductance $L_1$ of Fig. 2 or the reactance-frequency variation of the sum of the inductances $I_2'$ and $L_1$ of Fig. 3.

Curve (16) represents the variation with frequency of the reactance of the elevated conductor per se of Figs. 2 and 3.

Curve (12') being the algebraic sum of curves (15) and (16) represents the reactance-frequency variation of the elevated conductor V$o$ of Figs. 2 and 3.

Curve (11') shows the variation with frequency of the joint reactance of the system consisting of the parallel branch circuit and the earth connector of Figs. 2 and 3.

Curve (13') being the algebraic sum of curves (11') and (12') represents the variation with frequency of the total reactance of the elevated conductor system as measured at the point $o$. Curve (13') crosses the axis of abscissæ at three points, namely, $n$, $n''$ and $n'$, in a manner similar to the corresponding curve shown as (13) in Fig. 6, with this difference, however, that in Fig. 11 the points $n$ and $n'$ are nearer to the point $n''$ than in Fig. 6. For electrical oscillations of frequencies $n$, $n''$ and $n'$ the reactance of the elevated conductor system is zero.

The significance of the several frequencies represented by $n$, $n''$ and $n'$ in Fig. 11 is the same as that of the frequencies represented by the same reference characters, respectively, on the axis of abscissæ in Fig. 6, and discussed above in connection with Case I$^a$.

Curve (14) in Fig. 11 represents the variation with frequency of the resistance equivalent of radiation of the elevated conductor per se in Figs. 2 and 3, and the ordinate of curve (14) in Fig. 11 is 32 for frequency $n'''$, which, as before stated, represents the fundamental of the unloaded vertical V.

For the purpose of more conveniently comparing the frequency-reactance variation curves of the elevated conductor system with the current-frequency variation curves, curve (13') has been reproduced in Fig. 12, and Fig. 13 which is placed directly below Fig. 12 shows the variation with frequency for persistent electrical forces of the amplitude of current developed in the elevated conductor V$o$ of Figs. 2 and 3 at a point slightly above the point $o$ therein. The curves in Figs. 14, 15 and 16 represent respectively the variation with frequency for persistent electrical forces of the amplitude of the current developed in the inductance branch of the parallel branch circuit, in the earth connector and in the condenser branch of the parallel branch circuit. Figs. 14 and 16 show that for frequency $n''$ the current in the inductance and condenser branches of the parallel branch circuit is zero because for said frequency the earth connector which is connected in shunt to said parallel branch circuit has zero reactance. Fig. 15 shows for frequency $n$, which is that of the waves to be received, a maximum very much smaller than that shown for the same frequency in Fig. 14, and shows also a maximum for frequency $n''$ which is that of the most pronounced natural rate of vibration of the elevated conductor system and for which the current in the inductance branch of the parallel branch circuit is zero. In other words, the current-frequency variation curves shown in Figs. 13 to 16 exhibit in general the same characteristics as those exhibited by the corresponding curves shown in Figs. 7 to 10, and it will be noted that in Fig. 14 a change in frequency of one part in 4000 increases the amplitude of the current developed in the inductance branch of the parallel branch circuit six thousand per cent. (6000).

It will be readily apparent by a comparison of Figs. 6 and 11 that, in the present instance, the frequency $n$ of the waves the energy of which is to be received is higher for systems designed under Case II$^a$ than for systems designed under Case I$^a$. Furthermore it will appear that the frequency $n$ can bear any desired relation to frequency $n''$, and that it may be made as high as necessary under the existing conditions of wireless telegraph practice by suitably choosing the frequency $n'''$ and the capacity and inductance of the system. An advantage in using the loading inductance is made manifest by Fig. 11 in which it will be seen that the first portion of curve (13'), or that portion thereof which crosses the axis of abscissæ at the point $n$, is a much steeper curve than the corresponding portion of curve (13) in Fig. 6.

In order to increase frequency $n$, the frequency natural to the parallel branch circuit may be increased. Such increase in the frequency natural to said parallel branch circuit cannot be illustrated diagrammatically, so that Fig. 1 also represents Case I$^b$ in which the frequency natural to the parallel branch circuit is equal to that of the elevated conductor. The curves shown in Figs. 17 and 18 represent the variation with frequency for persistent electrical forces of the current amplitudes in the inductance branch of the parallel branch circuit and in the earth connector, respectively, for systems designed in accordance with Case I$^b$. These curves correspond with those shown in Figs. 8 and 9, respectively. It will be noted that frequency $n$ in Figs. 17 and 18 is higher than frequency $n$ in Figs. 8 and 9, respectively, that the maximum for frequnecy $n$ in Fig. 18 is very much smaller than the maximum for the corresponding frequency in Fig. 17 and that the curves in general correspond to those shown in Figs. 8 and 9.

Figs. 19 and 20 show the current-frequency variation for the inductance branch of the parallel branch circuit and earth connector, respectively, for Case II$^b$. It will be noted that these curves correspond in general with those shown for the corresponding elements of the system designed in accordance with Case II$^a$ in Figs. 14 and 15, and that the frequency $n$ in Figs. 19 and 20 is higher than frequency $n$ in Figs. 14 and 15. The systems shown in Figs. 2 and 3 represent diagrammatically systems falling within the general Case II$^b$, in which a loaded vertical is employed and in which the parallel branch circuit has a frequency equal to that of the elevated conductor $V_o$.

Figs. 21 and 22 show the variation with frequency for persistent electrical forces of the current amplitudes in the inductance branch of the parallel branch circuit and in the earth connector respectively, of systems designed in accordance with Case I$^c$, and the curves shown in said figures will be seen to correspond in a general way with those shown in Figs. 8 and 9 for Case I$^a$ and with those shown in Figs. 17 and 18 for Case I$^b$. It will be noted that as the frequency of the parallel branch circuit is increased, the frequency $n$ to which the elevated conductor system is most responsive increases.

The curves shown in Figs. 23 and 24 show the current-frequency variation for the inductance branch of the parallel branch circuit and the earth connector, respectively, of systems designed in accordance with Case II$^c$, in which case a loading inductance $L_1$ is employed and in which the frequency of the parallel branch circuit is higher than that natural to the elevated conductor $V_o$. Inasmuch as the electromagnetic constants cannot be indicated diagrammatically in Figs. 1, 2 and 3, Fig. 1 represents a system falling under Case I$^c$ and Figs. 2 and 3 represent systems falling under Case II$^c$, as well as systems falling under the other cases hereinbefore described.

It will be noted that the curves shown in Figs. 23 and 24 conform generally with the corresponding curves shown in Figs. 14 and 15 for Case II$^a$ and with those shown in Figs. 19 and 20 for Case II$^b$; and also that the frequency $n$ for Cases II$^a$, II$^b$ and II$^c$ is higher than for Cases I$^a$, I$^b$ and I$^c$, respectively.

In Figs. 21 and 22, the point $n'$ does not appear because the frequency $n'$ is higher than the first even harmonic $n_2''$ of the elevated conductor.

In all the cases above described better results are obtained by making the selectance function of the earth connector equal for a given frequency to that of the elevated conductor for such frequency. It being impossible to indicate diagrammatically the relations existing between the selectance functions of the earth connector and elevated conductor in Figs. 1, 2 and 3, each of said figures may be taken as representing systems in which the selectance function of the earth connector $oE'$ is greater than that of the elevated conductor $Vo$ for such frequency, as well as systems in which any other relation exists between the selectance functions of such component parts.

In Fig. 3, the depression of the key K by opening the contact at $k''$ and closing the contact at $k$ prior to closing the contact at $k'$, enables a receiving operator to interrupt the transmission from a distant station when such receiving operator fails to understand a portion of the message which is being transmitted to him. A practically negligible difference of potential existing between the points $t'$, $o'$ when the contact at $k$ is closed, the oscillations developed in the elevated transmitting conductor system V I$_c'$ $t'$ $o'$ E E' develop currents of practically negligible amplitude in the receiving system, and the point $o'$ having practically zero potential to earth, the lead $o'$ E E' being of practically zero resistance, the potential of the receiving system as a whole is not appreciably elevated by said oscillations. The opening of the circuit of the oscillation detector at the point $k''$ serves to protect the oscillation detector from any currents that may be developed in said circuit during transmission. It is immaterial whether the contact $k''$ is opened simultaneously with the closure of the contact $k$ or is opened before or after such closure, but it is of course necessary that $k''$ be opened and $k$ be closed before the generator A is connected in circuit with the primary of the transformer M'' by the closure of the contact $k'$. It will be noted that the earth connections E, E' which are shown separately in Figs. 1 and 2 are shown in Fig. 3 as the single earth connection E E'.

I claim,—

1. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit.

2. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency.

3. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit, and said parallel branch circuit having, for persistent electrical oscillations of the frequency of the waves the energy of which is to be received, a reactance equal and opposite to the resultant reactance of said elevated conductor and its earth connector.

4. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency; and said parallel branch circuit having, for persistent electrical oscillations of the frequency of the waves the energy of which is to be received, a reactance equal and opposite to the resultant reactance of said elevated conductor and its earth connector.

5. In a space telegraph receiving system, an elevated conductor system comprising a parallel branch circuit including capacity in one branch and inductance in the other branch, an elevated conductor and an earth connector including a serially connected inductance and capacity; said elevated conductor and earth connector being connected in parallel with respect to said parallel branch circuit.

6. In a space telegraph receiving system, an elevated conductor system comprising a parallel branch circuit including capacity in one branch and inductance in the other branch, an elevated conductor and an earth connector including a serially connected inductance and capacity; said elevated conductor and earth connector being connected in parallel with respect to said parallel branch circuit and each, when isolated, having zero reactance for the same definite frequency.

7. In a space telegraph receiving system, an elevated conductor system comprising a parallel branch circuit including capacity in one branch and inductance in the other branch, an elevated conductor and an earth connector including a serially connected inductance and capacity; said elevated conductor and earth connector being connected in parallel with respect to said parallel branch circuit, and said parallel branch circuit having, for persistent electrical oscillations of the frequency of the waves the energy of which is to be received, a reactance equal and opposite to the resultant reactance of said elevated conductor and its earth connector.

8. In a space telegraph receiving system, an elevated conductor system comprising a parallel branch circuit including capacity in one branch and inductance in the other branch, an elevated conductor and an earth connector including a serially connected inductance and capacity; said elevated conductor and earth connector being connected in parallel with respect to said parallel branch circuit and each, when isolated, having zero reactance for the same definite frequency; and said parallel branch circuit having, for persistent electrical oscillations of the frequency of the waves the energy of which is to be received, a reactance equal and opposite to the resultant reactance of said elevated conductor and its earth connector.

9. In a space telegraph receiving system, an elevated conductor system comprising a circuit, an oscillation detector and means associating said oscillation detector with said circuit, an elevated conductor and an earth connector; said elevated conductor and earth connector being connected in parallel with respect to said circuit.

10. In a space telegraph receiving system, an elevated conductor system comprising a circuit, an oscillation detector and means associating said oscillation detector with said circuit, an elevated conductor and an earth connector; said elevated conductor and earth connector being connected in parallel with respect to said circuit and each, when isolated, having zero reactance for the same definite frequency.

11. In a space telegraph receiving system, an elevated conductor system comprising a circuit, an oscillation detector and means associating said oscillation detector with said circuit, an elevated conductor and an earth connector; said elevated conductor and earth connector being connected in parallel with respect to said circuit and said circuit having, for persistent electrical oscillations of the frequency of the waves the energy of which is to be received, a reactance equal and opposite to the resultant reactance of said elevated conductor and its earth connector.

12. In a space telegraph receiving system, an elevated conductor system comprising a circuit, an oscillation detector and means associating said oscillation detector with said circuit, an elevated conductor and an earth connector; said elevated conductor and earth connector being connected in parallel with respect to said circuit and each, when isolated, having zero reactance for the same definite frequency; and said circuit having, for persistent electrical oscillations of the frequency of the waves the energy of which is to be received, a reactance equal and opposite to the resultant reactance of said elevated conductor and its earth connector.

13. In a space telegraph receiving system, an elevated conductor system comprising a circuit, an oscillation detector and means associating said oscillation detector with said circuit, an elevated conductor and an earth connector including a serially connected inductance and capacity; said elevated conductor and earth connector being connected in parallel with said circuit.

14. In a space telegraph receiving system, an elevated conductor system comprising a circuit, an oscillation detector and means associating said oscillation detector with said circuit, an elevated conductor and an earth connector including a serially connected inductance and capacity; said elevated conductor and earth connector being connected in parallel with said circuit and each, when isolated, having zero reactance for the same definite frequency.

15. In a space telegraph receiving system, an elevated conductor system comprising a circuit, an oscillation detector and means associating said oscillation detector with said circuit, an elevated conductor and an earth connector including a serially connected inductance and capacity; said elevated conductor and earth connector being connected in parallel with said circuit and said circuit having, for persistent electrical oscillations of the frequency of the waves the energy of which is to be received, a reactance equal and opposite to the resultant reactance of said elevated conductor and its earth connector.

16. In a space telegraph receiving system, an elevated conductor system comprising a circuit, an oscillation detector and means associating said oscillation detector with said circuit, an elevated conductor and an earth connector including a serially connected inductance and capacity; said elevated conductor and earth connector being connected in parallel with said circuit and each, when isolated, having zero reactance for the same definite frequency; and said circuit having, for persistent electrical oscillations of the frequency of the waves the energy of which is to be received, a reactance equal and opposite to the resultant reactance of said elevated conductor and its earth connector.

17. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and said earth connector having for the frequency for which its reactance is zero a selectance function equal to that of the elevated conductor.

18. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency, but the earth connector having for said frequency a selectance function equal to that of the elevated conductor.

19. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and said earth connector having for the frequency for which its reactance is zero a selectance function equal to that of the elevated conductor; and said parallel branch circuit having, for persistent electrical oscillations of the frequency of the waves the energy of which is to be received, a reactance equal and opposite to the resultant reactance of said elevated conductor and its earth connector.

20. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency, but the earth connector having for said frequency a selectance function equal to that of the elevated conductor; and said parallel branch circuit having for persistent electrical oscillations of the frequency of the waves the energy of which is to be received, a reactance equal and opposite to the resultant reactance of said elevated conductor and its earth connector.

21. In a space telegraph receiving system, an elevated conductor system comprising a parallel branch circuit including capacity in one branch and inductance in the other branch, an elevated conductor and an earth connector including a serially connected inductance and capacity; said elevated conductor and earth connector being connected in parallel with respect to said parallel branch circuit and said earth connector having for the frequency for which its reactance is zero a selectance function equal to that of the elevated conductor.

22. In a space telegraph receiving system, an elevated conductor system comprising a parallel branch circuit including capacity in one branch and inductance in the other branch, an elevated conductor and an earth connector including a serially connected inductance and capacity; said elevated conductor and earth connector being connected in parallel with respect to said parallel branch circuit and each, when isolated, having zero reactance for the same definite frequency, but the earth connector having for said frequency a selectance function equal to that of the elevated conductor.

23. In a space telegraph receiving system, an elevated conductor system comprising a parallel branch circuit including capacity in one branch and inductance in the other branch, an elevated conductor and an earth connector including a serially connected inductance and capacity; said elevated conductor and earth connector being connected in parallel with respect to said parallel branch circuit and said earth connector having for the frequency for which its reactance is zero a selectance function equal to that of the elevated conductor; and said parallel branch circuit having for persistent electrical oscillations of the frequency of the waves the energy of which is to be received, a reactance equal and opposite to the resultant reactance of said elevated conductor and its earth connector.

24. In a space telegraph receiving system, an elevated conductor system comprising a parallel branch circuit including capacity in one branch and inductance in the other branch, an elevated conductor and an earth connector including a serially connected inductance and capacity; said elevated conductor and earth connector being connected in parallel with respect to said parallel branch circuit and each, when isolated, having zero reactance for the same definite frequency, but the earth connector having for said frequency a selectance function equal to that of the elevated conductor; and said parallel branch circuit having for persistent electrical oscillations of the frequency of the waves the energy of which is to be received, a reactance equal and opposite to the resultant reactance of said elevated conductor and its earth connector.

25. In a space telegraph receiving system, an elevated conductor system comprising a circuit, an oscillation detector and means associating said oscillation detector with said circuit, an elevated conductor and an earth connector; said elevated conductor and earth connector being connected in parallel with respect to said circuit and said earth connector having for the frequency for which its reactance is zero a selectance function equal to that of the elevated conductor.

26. In a space telegraph receiving system, an elevated conductor system comprising a circuit, an oscillation detector and means associating said oscillation detector with said circuit, an elevated conductor and an earth connector; said elevated conductor and earth connector being connected in parallel with respect to said circuit and each, when isolated, having zero reactance for the same definite frequency, but the earth connector having for said frequency a selectance function equal to that of the elevated conductor.

27. In a space telegraph receiving system, an elevated conductor system comprising a circuit, an oscillation detector and means associating said oscillation detector with said circuit, an elevated conductor and an earth connector; said elevated conductor and earth connector being connected in parallel with respect to said circuit and said earth connector having for the frequency for which its reactance is zero a selectance function equal to that of the elevated conductor; and said parallel branch circuit having for persistent electrical oscillations of the frequency of the waves the energy of which is to be received, a reactance equal and opposite to the resultant reactance of said elevated conductor and its earth connector.

28. In a space telegraph receiving system, an elevated conductor system comprising a circuit, an oscillation detector and means associating said oscillation detector with said circuit, an elevated conductor and an earth connector; said elevated conductor and earth connector being connected in parallel with respect to said circuit and each, when isolated, having zero reactance for the same definite frequency, but the earth connector having for said frequency a selectance function equal to that of the elevated conductor; and said circuit having for persistent electrical oscillations of the frequency of the waves the energy of which is to be received, a reactance equal and opposite to the resultant reactance of said elevated conductor and its earth connector.

29. In a space telegraph receiving system, an elevated conductor system comprising a circuit, an oscillation detector and means associating said oscillation detector with said circuit, an elevated conductor and an earth connector including a serially connected inductance and capacity; said elevated conductor and earth connector being connected in parallel with respect to said circuit and said earth connector having for the frequency for which its reactance is zero a selectance function equal to that of the elevated conductor.

30. In a space telegraph receiving system, an elevated conductor system comprising a circuit, an oscillation detector and means associating said oscillation detector with said circuit, an elevated conductor and an earth connector including a serially connected inductance and capacity; said elevated conductor and earth connector being connected in parallel with respect to said circuit and each, when isolated, having zero reactance for the same definite frequency, but the earth connector having for said frequency a selectance function equal to that of the elevated conductor.

31. In a space telegraph receiving system, an elevated conductor system comprising a circuit, an oscillation detector and means associating said oscillation detector with said circuit, an elevated conductor and an earth connector including a serially connected inductance and capacity; said elevated conductor and earth connector being connected in parallel with respect to said circuit and said earth connector having for the frequency for which its reactance is zero a selectance function equal to that of the elevated conductor; and said parallel branch circuit having for persistent electrical oscillations of the frequency of the waves the energy of which is to be received, a reactance equal and opposite to the resultant reactance of said elevated conductor and its earth connector.

32. In a space telegraph receiving system, an elevated conductor system comprising a circuit, an oscillation detector and means associating said oscillation detector with said circuit, an elevated conductor and an earth connector including a serially connected inductance and capacity; said elevated conductor and earth connector being connected in parallel with respect to said circuit and each, when isolated, having zero reactance for the same definite frequency, but the earth connector having for said frequency a selectance function equal to that of the elevated conductor; and said circuit having for persistent electrical oscillations of the frequency of the waves the energy of which is to be received, a reactant equal and opposite to the resultant reactance of said elevated conductor and its earth connector.

33. In a space telegraph receiving system, an elevated conductor system comprising a parallel branch circuit including capacity in one branch and inductance in the other branch, an elevated conductor including a serially connected inductance, and an earth connector; said elevated conductor and earth connector being connected in parallel with respect to said parallel branch circuit.

34. In a space telegraph receiving system, an elevated conductor system comprising a parallel branch circuit including capacity in one branch and inductance in the other branch, an elevated conductor including a serially connected inductance, and an earth connector; said elevated conductor and earth connector being connected in parallel with respect to said parallel branch circuit and each, when isolated, having zero reactance for the same definite frequency.

35. In a space telegraph receiving system, an elevated conductor system comprising a parallel branch circuit including capacity in one branch and inductance in the other branch, an elevated conductor including a serially connected inductance, and an earth connector; said elevated conductor and earth connector being connected in parallel with respect to said parallel branch circuit and said parallel branch circuit having, for persistant electrical oscillations of the frequency of the waves the energy of which is to be received, a reactance equal and opposite to the resultant reactance of said elevated conductor and its earth connector.

36. In a space telegraph receiving system, an elevated conductor system comprising a parallel branch circuit including capacity in one branch and inductance in the other branch, an elevated conductor including a serially connected inductance, and an earth connector; said elevated conductor and earth connector being connected in parallel with respect to said parallel branch circuit and each, when isolated, having zero reactance for the same definite frequency; and said parallel branch circuit having, for persistent electrical oscillations of the frequency of the waves the energy of which is to be received, a reactance equal and opposite to the resultant reactance of said elevated conductor and its earth connector.

37. In a space telegraph receiving system, an elevated conductor system comprising a parallel branch circuit including capacity in one branch and inductance in the other branch, an elevated conductor including a serially connected inductance, and an earth connector including a serially connected inductance and capacity; said elevated conductor and earth connector being connected in parallel with respect to said parallel branch circuit.

38. In a space telegraph receiving system, an elevated conductor system comprising a parallel branch circuit including capacity in one branch and inductance in the other branch, an elevated conductor including a serially connected inductance, and an earth connector including a serially connected inductance and capacity; said elevated conductor and earth connector being connected in parallel with respect to parallel branch circuit and each, when isolated, having zero reactance for the same definite frequency.

39. In a space telegraph receiving system, an elevated conductor system comprising a parallel branch circuit including capacity in one branch and inductance in the other branch, an elevated conductor including a serially connected inductance, and an earth connector including a serially connected inductance and capacity; said elevated conductor and earth connector being connected in parallel with respect to said parallel branch circuit, and said parallel branch circuit having, for persistent electrical oscillations of the frequency of the waves the energy of which is to be received, a reactance equal and opposite to the resultant reactance of said elevated conductor and its earth connector.

40. In a space telegraph receiving system, an elevated conductor system comprising a parallel branch circuit including capacity in one branch and inductance in the other branch, an elevated conductor including a serially connected inductance, and an earth connector including a serially connected inductance and capacity; said elevated conductor and earth connector being connected in parallel with respect to said parallel branch circuit and each, when isolated, having zero reactance for the same definite frequency; and said parallel branch circuit having, for persistent electrical oscillations of the frequency of the waves the energy of which is to be received, a reactance equal and opposite to the resultant reactance of said elevated conductor and its earth connector.

41. In a space telegraph receiving system, an elevated conductor system comprising a circuit, an oscillation detector and means associating said oscillation detector with said circuit, an elevated conductor including a serially connected inductance, and an earth connector; said elevated conductor and earth connector being connected in parallel with respect to said circuit.

42. In a space telegraph receiving system, an elevated conductor system comprising a circuit, an oscillation detector and means associating said oscillation detector with said circuit, an elevated conductor including a serially connected inductance, and an earth connector; said elevated conductor and earth connector being connected in parallel with respect to said circuit and each, when isolated, having zero reactance for the same definite frequency.

43. In a space telegraph receiving system, an elevated conductor system comprising a circuit, an oscillation detector and means associating said oscillation detector with said circuit, an elevated conductor including a serially connected inductance, and an earth connector; said elevated conductor and earth connector being connected in parallel with respect to said circuit and said circuit having, for persistent electrical oscillations of the frequency of the waves the energy of which is to be received, a reactance equal and opposite to the resultant reactance of said elevated conductor and its earth connector.

44. In a space telegraph receiving system, an elevated conductor system comprising a circuit, an oscillation detector and means associating said oscillation detector with said circuit, an elevated conductor including a serially connected inductance and an earth connector; said elevated conductor and earth connector being connected in parallel with respect to said circuit and each, when isolated, having zero reactance for the same definite frequency; and said circuit having, for persistent electrical oscillations of the frequency of the waves the energy of which is to be received, a reactance equal and opposite to the resultant reactance of said elevated conductor and its earth connector.

45. In a space telegraph receiving system, an elevated conductor system comprising a circuit, an oscillation detector and means associating said oscillation detector with said circuit, an elevated conductor including a serially connected inductance, and an earth connector including a serially connected inductance and capacity; said elevated conductor and earth connector being connected in parallel with said circuit.

46. In a space telegraph receiving system, an elevated conductor system comprising a circuit, an oscillation detector and means associating said oscillation detector with said circuit, an elevated conductor including a serially connected inductance, and an earth connector including a serially connected inductance and capacity; said elevated conductor and earth connector being connected in parallel with said circuit and each, when isolated, having zero reactance for the same definite frequency.

47. In a space telegraph receiving system, an elevated conductor system comprising a circuit, an oscillation detector and means associating said oscillation detector with said circuit, an elevated conductor including a serially connected inductance, and an earth connector including a serially connected inductance and capacity; said elevated conductor and earth connector being connected in parallel with said circuit and said circuit having, for persistent electrical oscillations of the frequency of the waves the energy of which is to be received, a reactance equal and opposite to the resultant reactance of said elevated conductor and its earth connector.

48. In a space telegraph receiving system, an elevated conductor system comprising a circuit, an oscillation detector and means associating said oscillation detector with said circuit, an elevated conductor including a serially connected inductance, and an earth connector including a serially connected inductance and capacity; said elevated conductor and earth connector being connected in parallel with said circuit and each, when isolated, having zero reactance for the same definite frequency; and said circuit having, for persistent electrical oscillations of the frequency of the waves the energy of which is to be received, a reactance equal and opposite to the resultant reactance of said elevated conductor and its earth connector.

49. In a space telegraph receiving system, an elevated conductor system comprising a parallel branch circuit including capacity in one branch and inductance in the other branch, an elevated conductor including a serially connected inductance, and an earth connector; said elevated conductor and earth connector being connected in parallel with respect to said parallel branch circuit and said earth connector having for the frequency for which its reactance is zero a selectance function equal to that of the elevated conductor.

50. In a space telegraph receiving system, an elevated conductor system comprising a parallel branch circuit including capacity in one branch and inductance in the other branch, an elevated conductor including a serially connected inductance, and an earth connector; said elevated conductor and earth connector being connected in parallel with respect to said parallel branch circuit and each, when isolated, having zero reactance for the same definite frequency but the earth connector having for said frequency a selectance function equal to that of the elevated conductor.

51. In a space telegraph receiving system, an elevated conductor system comprising a parallel branch circuit including capacity in one branch and inductance in the other branch, an elevated conductor including a serially connected inductance, and an earth connector; said elevated conductor and earth connector being connected in parallel with respect to said parallel branch circuit and said earth connector having for the frequency for which its reactance is zero a selectance function equal to that of the elevated conductor; and said parallel branch circuit having, for persistent electrical oscillations of the frequency of the waves the energy of which is to be received, a reactance equal and opposite to the resultant reactance of said elevated conductor and its earth connector.

52. In a space telegraph receiving system, an elevated conductor system comprising a parallel branch circuit including capacity in one branch and inductance in the other branch, an elevated conductor including a serially connected inductance, and an earth connector; said elevated conductor and earth connector being connected in parallel with respect to said parallel branch circuit and each, when isolated, having zero reactance for the same definite frequency, but the earth connector having for said frequency a selectance function equal to that of the elevated conductor; and said parallel branch circuit having for persistent electrical oscillations of the frequency of the waves the energy of which is to be received, a reactance equal and opposite to the resultant reactance of said elevated conductor and its earth connector.

53. In a space telegraph receiving system, an elevated conductor system comprising a parallel branch circuit including capacity in one branch and inductance in the other branch, an elevated conductor including a serially connected inductance, and an earth connector including a serially connected inductance and capacity; said elevated conductor and earth connector being connected in parallel with respect to said parallel branch circuit and said earth connector having for the frequency for which its reactance is zero a selectance function equal to that of the elevated conductor.

54. In a space telegraph receiving system, an elevated conductor system comprising a parallel branch circuit including capacity in one branch and inductance in the other branch, an elevated conductor including a serially connected inductance, and an earth connector including a serially connected inductance and capacity; said elevated conductor and earth connector being connected in parallel with respect to said parallel branch circuit and each, when isolated, having zero reactance for the same definite frequency, but the earth connector having for said frequency a selectance function equal to that of the elevated conductor.

55. In a space telegraph receiving system, an elevated conductor system comprising a parallel branch circuit including capacity in one branch and inductance in the other branch, an elevated conductor including a serially connected inductance, and an earth connector including a serially connected inductance and capacity; said elevated conductor and earth connector being connected in parallel with respect to said parallel branch circuit and said earth connector having for the frequency for which its reactance is zero a selectance function equal to that of the elevated conductor; and said parallel branch circuit having, for persistent electrical oscillations of the frequency of the waves the energy of which is to be received, a reactance equal and opposite to the resultant reactance of said elevated conductor and its earth connector.

56. In a space telegraph receiving system, an elevated conductor system comprising a parallel branch circuit including capacity in one branch and inductance in the other branch, an elevated conductor including a serially connected inductance, and an earth connector including a serially connected inductance and capacity; said elevated conductor and earth connector being connected in parallel with respect to said parallel branch circuit and each, when isolated, having zero reactance for the same definite frequency, but the earth connector having for said frequency a selectance function equal to that of the elevated conductor; and said parallel branch circuit, having for persistent electrical oscillations of the frequency of the waves the energy of which is to be received, a reactance equal and opposite to the resultant reactance of said elevated conductor and its earth connector.

57. In a space telegraph receiving system, an elevated conductor system comprising a circuit, an oscillation detector and means associating said oscillation detector with said circuit, an elevated conductor including a serially connected inductance, and an earth connector; said elevated conductor and earth connector being connected in parallel with respect to said circuit and said earth connector having for the frequency for which its reactance is zero a selectance function equal to that of the elevated conductor.

58. In a space telegraph receiving system, an elevated conductor system comprising a circuit, an oscillation detector and means associating said oscillation detector with said circuit, an elevated conductor including a serially connected inductance, and an earth connector; said elevated conductor and earth connector being connected in parallel with respect to said circuit and each, when isolated, having zero reactance for the same definite frequency, but the earth connector having for said frequency a selectance function equal to that of the elevated conductor.

59. In a space telegraph receiving system, an elevated conductor system comprising a circuit, an oscillation detector and means associating said oscillation detector with said circuit, an elevated conductor including a serially connected inductance, and an earth connector; said elevated conductor and earth connector being connected in parallel with respect to said circuit and said earth connector having for the frequency for which its reactance is zero a selectance function equal to that of the elevated conductor; and said parallel branch circuit having for persistent electrical oscillations of the frequency of the waves the energy of which is to be received, a reactance equal and opposite to the resultant reactance of said elevated conductor and its earth connector.

60. In a space telegraph receiving system, an elevated conductor system comprising a circuit, an oscillation detector and means associating said oscillation detector with said circuit, an elevated conductor including a serially connected inductance, and an earth connector; said elevated conductor and earth connector being connected in parallel with respect to said circuit and each, when isolated, having zero reactance for the same definite frequency, but the earth connector having for said frequency a selectance function equal to that of the elevated conductor; and said circuit having for persistent electrical oscillations of the frequency of the waves the energy of which is to be received, a reactance equal and opposite to the resultant reactance of said elevated conductor and its earth connector.

61. In a space telegraph receiving system, an elevated conductor system comprising a circuit, an oscillation detector and means associating said oscillation detector with said circuit, an elevated conductor including a serially connected inductance, and an earth connector including a serially connected inductance and capacity; said elevated conductor and earth connector being connected in parallel with respect to said circuit and said earth connector having for the frequency for which its reactance is zero a selectance function equal to that of the elevated conductor.

62. In a space telegraph receiving system, an elevated conductor system comprising a circuit, an oscillation detector and means associating said oscillation detector with said circuit, an elevated conductor including a serially connected inductance, and an earth connector including a serially connected inductance and capacity; said elevated conductor and earth connector being connected in parallel with respect to said circuit and each, when isolated, having zero reactance for the same definite frequency, but the earth connector having for said frequency a selectance function equal to that of the elevated conductor.

63. In a space telegraph receiving system, an elevated conductor system comprising a circuit, an oscillation detector and means associating said oscillation detector with said circuit, an elevated conductor including a serially connected inductance, and an earth connector including a serially connected inductance and capacity; said elevated conductor and earth connector being connected in parallel with respect to said circuit and said earth connector having for the frequency for which its reactance is zero a selectance function equal to that of the elevated conductor; and said parallel branch circuit having for persistent electrical oscillations of the frequency of the waves the energy of which is to be received, a reactance equal and opposite to the resultant reactance of said elevated conductor and its earth connector.

64. In a space telegraph receiving system, an elevated conductor system comprising a circuit, an oscillation detector and means associating said oscillation detector with said circuit, an elevated conductor including a serially connected inductance, and an earth connector including a serially connected inductance and capacity; said elevated conductor and earth connector being connected in parallel with respect to said circuit and each, when isolated, having zero reactance for the same definite frequency, but the earth connector having for said frequency a selectance function higher than that of the elevated conductor; and said circuit having for persistent electrical oscillations of the frequency of the waves the energy of which is to be received, a reactance equal and opposite to the resultant reactance of said elevated conductor and its earth connector.

65. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit; and said parallel branch circuit, when isolated, having zero reactance for a frequency lower than that natural to said elevated conductor and earth connector.

66. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency; and said parallel branch circuit, when isolated, having zero reactance for a frequency lower than that natural to said elevated conductor and earth connector.

67. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit, and said parallel branch circuit having, for persistent electrical oscillations of the frequency of the waves the energy of which is to be received, a reactance equal and opposite to the resultant reactance of said elevated conductor and its earth connector; and said parallel branch circuit, when isolated, having zero reactance for a frequency lower than that natural to said elevated conductor and earth connector.

68. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency; said parallel branch circuit having, for persistent electrical oscillations of the frequency of the waves the energy of which is to be received, a reactance equal and opposite to the resultant reactance of said elevated conductor and its earth connector; and said parallel branch circuit, when isolated, having zero reactance for a frequency lower than that natural to said elevated conductor and earth connector.

69. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and said earth connector having for the frequency for which its reactance is zero a selectance function higher than that of the elevated conductor; and said parallel branch circuit, when isolated, having zero reactance for a frequency lower than that natural to said elevated conductor and earth connector.

70. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency, but the earth connector having for said frequency a selectance function higher than that of the elevated conductor; and said parallel branch circuit, when isolated, having zero reactance for a frequency lower than that natural to said elevated conductor and earth connector.

71. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and said earth connector having for the frequency for which its reactance is zero a selectance function higher than that of the elevated conductor; said parallel branch circuit having, for persistent electrical oscillations of the frequency of the waves the energy of which is to be received, a reactance equal and opposite to the resultant reactance of said elevated conductor and its earth connector; and said parallel branch circuit, when isolated, having zero reactance for a frequency lower than that natural to said elevated conductor and earth connector.

72. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency, but the earth connector having for said frequency a selectance function higher than that of the elevated conductor; said parallel branch circuit having, for persistent electrical oscillations of the frequency of the waves the energy of which is to be received, a reactance equal and opposite to the resultant reactance of said elevated conductor and its earth connector; and said parallel branch circuit, when isolated, having zero reactance for a frequency lower than that natural to said elevated conductor and earth connector.

73. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and each, when isolated, having zero reactance for the same definite frequency; and said parallel branch circuit having, for persistent electrical oscillations of the frequency of the waves the energy of which is to be received, an inductance reactance equal to the resultant capacity reactance of said elevated conductor and its earth connector.

74. In a space telegraph receiving system, a resonant receiving circuit attuned to the frequency of the waves the energy of which is to be received, a parallel branch circuit including capacity in one branch and inductance in the other branch and associated with said resonant circuit, an elevated conductor and an earth connector; said elevated conductor and earth connector being connected in parallel with respect to said parallel branch circuit, and each, when isolated, having zero reactance for a frequency higher than that to which said receiving circuit is attuned; and said parallel branch circuit having, for persistent electrical oscillations of the frequency to which said resonant receiving circuit is attuned, a reactance equal and opposite to the resultant reactance of said elevated conductor and its earth connector.

75. In a space telegraph receiving system, a resonant receiving circuit attuned to the frequency of the waves the energy of which is to be received, and an elevated conductor system associated with said resonant receiving circuit; said elevated conductor system comprising means whereby said system is given a plurality of natural rates of vibration different from that of said associated resonant receiving circuit and also comprising a circuit having, for such natural rates of vibration, an impedance low as compared to the impedance of said means, whereby such natural oscillations may be conveyed around said means.

76. In a space telegraph receiving system, a resonant receiving circuit, attuned to the frequency of the waves the energy of which is to be received, and an elevated conductor system associated with said resonant receiving circuit; said elevated conductor system comprising a parallel branch circuit, including capacity in one branch and inductance in the other branch and so constructed and arranged as to give the elevated conductor system a plurality of natural rates of vibration different from that of the associated resonant receiving circuit, and also comprising means so constructed and arranged as to prevent such natural oscillations from passing through the branches of said parallel branch circuit.

77. In a space telegraph receiving system, a resonant receiving circuit, attuned to the frequency of the waves the energy of which is to be received, and an elevated conductor system associated with said resonant receiving circuit; said elevated conductor system, comprising a parallel branch circuit including capacity in one branch and inductance in the other branch and so constructed and arranged as to give the elevated conductor system a plurality of natural rates of vibration different from that of the associated resonant receiving circuit, and also comprising means so constructed and arranged as to conduct such natural oscillations around said parallel branch circuit.

78. As a means for preventing a resonant receiving circuit of a space telegraph receiving system from responding to extraneous electrical impulses of frequencies to which the resonant receiving circuit is not attuned or to abrupt or impulsive electrical forces, a resonant receiving circuit attuned to the frequency of the waves the energy of which is to be received, an elevated conductor system associated with said resonant receiving circuit and having a plurality of natural rates of vibration different from that to which said resonant receiving circuit is attuned, and a circuit forming part of said elevated conductor system and constituting a path to earth of low impedance for such natural vibrations created in said elevated conductor system by such extraneous electrical impulses and abrupt or impulsive electrical forces.

79. As a means for preventing a resonant receiving circuit of a space telegraph receiving system from responding to extraneous electrical impulses of frequencies to which the resonant receiving circuit is not attuned or to abrupt or impulsive electrical forces, a resonant receiving circuit attuned to the frequency of the waves the energy of which is to be received, an elevated conductor system associated with said resonant receiving circuit and having a plurality of natural rates of vibration different from that to which said resonant receiving circuit is attuned, and a circuit forming part of said elevated conductor system and constituting a path to earth of zero impedance for natural oscillations having a frequency equal to the most pronounced natural rate of vibration of said elevated conductor system.

80. In a space telegraph receiving system, an elevated conductor system comprising a parallel branch circuit including capacity in one branch and inductance in the other branch, and a circuit including a serially connected inductance and capacity connected across the terminals of said parallel branch circuit.

81. In a space telegraph receiving system, an elevated receiving conductor, an oscillation detector, means associating said oscillation detector with said elevated conductor and a circuit connected around said means and determining the natural period of the elevated conductor system, said circuit being so constructed and arranged as to constitute a path of low impedance for natural oscillations of such period.

82. In a space telegraph receiving system, an elevated receiving conductor, a parallel branch circuit including capacity in one branch and inductance in the other branch and associated therewith, and a circuit connected around said parallel branch circuit; said parallel branch circuit having for persistent electrical oscillations of definite frequency a reactance smaller than that of said circuit, and said circuit having for natural oscillations created in the elevated conductor system by abrupt or impulsive electrical forces a reactance smaller than that of said parallel branch circuit.

83. In a space telegraph receiving system, an elevated receiving conductor, an oscillation detector, means associating said oscillation detector with said elevated conductor and a circuit connected around said means; said means having for persistent electrical oscillations of definite frequency a reactance smaller than that of said circuit and said circuit having for natural oscillations created in the elevated conductor system by abrupt or impulsive electrical forces a reactance smaller than that of said means.

84. In a space telegraph receiving system, an elevated conductor system comprising a circuit, an elevated conductor and an earth connector; said elevator conductor and earth connector being connected in parallel with respect to said circuit; and the system as a whole having zero reactance for a frequency equal to the fundamental frequency of said elevated conductor and also having zero reactance for two other frequencies, one of said frequencies being higher and the other lower than said fundamental frequency.

85. In a space telegraph receiving system, an elevated conductor system comprising an elevated conductor, an oscillation detector, means associating said oscillation detector with said elevated conductor, and means rendering the most pronounced natural rate of vibration of said elevated conductor system equal to the fundamental frequency of said elevated conductor and comprising a circuit having practically zero impedance for electrical oscillations of said frequency connected across the first mentioned means.

86. In a space telegraph receiving system, an elevated conductor system comprising an elevated conductor, an oscillation detector, a parallel branch circuit having capacity in one branch and inductance in the other branch and associating said oscillation detector with said elevated conductor, and means rendering the most pronounced natural rate of vibration of said elevated conductor system equal to the fundamental frequency of said elevated conductor and comprising a circuit having practically zero impedance for electrical oscillations of said frequency connected across said parallel branch circuit.

87. In a space telegraph receiving system, an elevated conductor system comprising a parallel branch circuit including capacity in one branch and inductance in the other branch, an elevated conductor and an earth connector; said elevated conductor and earth connector being connected in parallel with respect to said parallel branch circuit and the electromagnetic constants of said earth connector being so proportioned that, for the most pronounced natural rate of vibration of the elevated conductor system, the reaction of the parallel branch circuit upon said system is rendered practically zero.

88. In a space telegraph receiving system, an elevated conductor system comprising a parallel branch circuit including capacity in one branch and inductance in the other branch and means whereby the reaction of said parallel branch circuit upon the elevated conductor system is renderd practically zero for electrical oscillations of a definite frequency.

89. In a space telegraph receiving system, an elevated conductor system comprising an elevated conductor, a parallel branch circuit including capacity in one branch and inductance in the other branch and means whereby the reaction of said parallel branch circuit upon the elevated conductor system is rendered practically zero for electrical oscillations having a frequency equal to the fundamental frequency natural to said elevated conductor.

In testimony whereof, I have hereunto subscribed my name this 31st day of July 1906.

JOHN STONE STONE.

Witnesses:
  GEO. K. WOODWORTH,
  E. B. TOMLINSON.